US012739538B2

(12) United States Patent
Kasugai et al.

(10) Patent No.: US 12,739,538 B2
(45) Date of Patent: Sep. 15, 2026

(54) PHOTOELECTRIC CONVERSION DEVICE

(71) Applicant: CANON KABUSHIKI KAISHA, Tokyo (JP)

(72) Inventors: Taichi Kasugai, Tokyo (JP); Hiroaki Taniguchi, Tokyo (JP); Kohei Murayama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 23 days.

(21) Appl. No.: 19/059,000

(22) Filed: Feb. 20, 2025

(65) Prior Publication Data

US 2025/0267379 A1 Aug. 21, 2025

(30) Foreign Application Priority Data

Feb. 21, 2024 (JP) ................................ 2024-024377

(51) Int. Cl.
*H04N 25/78* (2023.01)
*H04N 25/768* (2023.01)
(Continued)

(52) U.S. Cl.
CPC ........... *H04N 25/78* (2023.01); *H04N 25/768* (2023.01); *H04N 25/771* (2023.01); *H04N 25/779* (2023.01)

(58) Field of Classification Search
CPC .... H04N 25/78; H04N 25/768; H04N 25/771; H04N 25/779; H04N 25/42; H04N 25/704; H04N 25/778
See application file for complete search history.

(56) References Cited

U.S. PATENT DOCUMENTS 6,933,978 B1 8/2005 Suda
10,389,964 B2 8/2019 Taniguchi
(Continued)

FOREIGN PATENT DOCUMENTS

JP 2001-124984 A 5/2001
JP 2016-21052 A 2/2016
(Continued)

OTHER PUBLICATIONS

U.S. Appl. No. 18/958,195, filed Nov. 25, 2024 by Tomoya Kokado.
(Continued)

*Primary Examiner* — Shahbaz Nazrul
(74) *Attorney, Agent, or Firm* — VENABLE LLP

(57) ABSTRACT

In a photoelectric conversion device, a pixel array is read in a first mode in which a signal based on charges obtained by adding a charge generated in a first photoelectric conversion unit and a charge generated in a second photoelectric conversion unit is read, and a second mode in which a signal based on a charge generated in any one of the first and second photoelectric conversion units is read, and then a signal based on charges obtained by adding charges generated in the first and second photoelectric conversion units is read, reading from a first region is performed in the first mode, reading from a second region is performed in the second mode, and reading from a part of a third region arranged between the first and second regions is performed in the first mode, and reading from another part of that is performed in the second mode.

20 Claims, 17 Drawing Sheets

(51) Int. Cl.
*H04N 25/771* (2023.01)
*H04N 25/779* (2023.01)

(56) References Cited

U.S. PATENT DOCUMENTS

| | | | | |
|---|---|---|---|---|
| 11,425,325 | B2 | 8/2022 | Kasugai | |
| 11,778,347 | B2 * | 10/2023 | Suzuki | H04N 25/705 348/272 |
| 11,838,668 | B2 * | 12/2023 | Kasugai | H04N 25/779 |
| 2015/0373287 | A1 | 12/2015 | Uchida | |
| 2017/0064226 | A1 * | 3/2017 | Ishii | G02B 7/346 |
| 2017/0142359 | A1 * | 5/2017 | Ikedo | H04N 25/704 |
| 2022/0408036 | A1 * | 12/2022 | Ashida | H04N 25/42 |
| 2023/0412940 | A1 * | 12/2023 | Shimada | H04N 25/704 |

FOREIGN PATENT DOCUMENTS

| | | | |
|---|---|---|---|
| JP | 2020-14147 | A | 1/2020 |
| JP | 2020-141347 | A | 9/2020 |
| JP | 2024-839 | A | 1/2024 |

OTHER PUBLICATIONS

U.S. Appl. No. 18/038,854, filed Jan. 28, 2025 by Momonosuke Odani.
U.S. Appl. No. 19/179,031, filed Apr. 15, 2025 by Hiroaki Taniguchi.

* cited by examiner

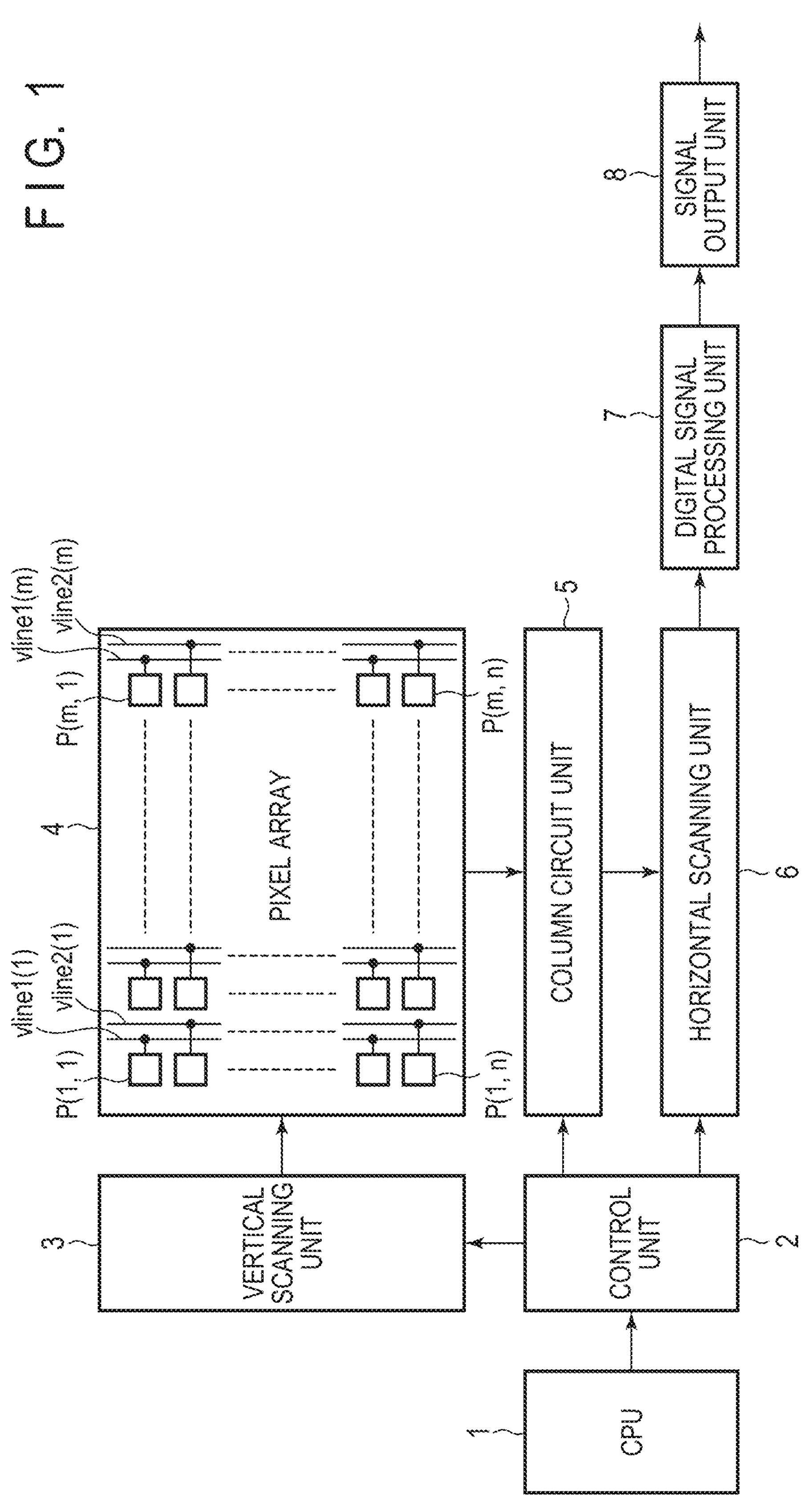
F I G. 1
CPU
CONTROL UNIT
VERTICAL SCANNING UNIT
PIXEL ARRAY
COLUMN CIRCUIT UNIT
HORIZONTAL SCANNING UNIT
DIGITAL SIGNAL PROCESSING UNIT
SIGNAL OUTPUT UNIT
P(1, 1)
P(m, 1)
P(1, n)
P(m, n)
vline1(1)
vline2(1)
vline1(m)
vline2(m)
1
2
3
4
5
6
7
8

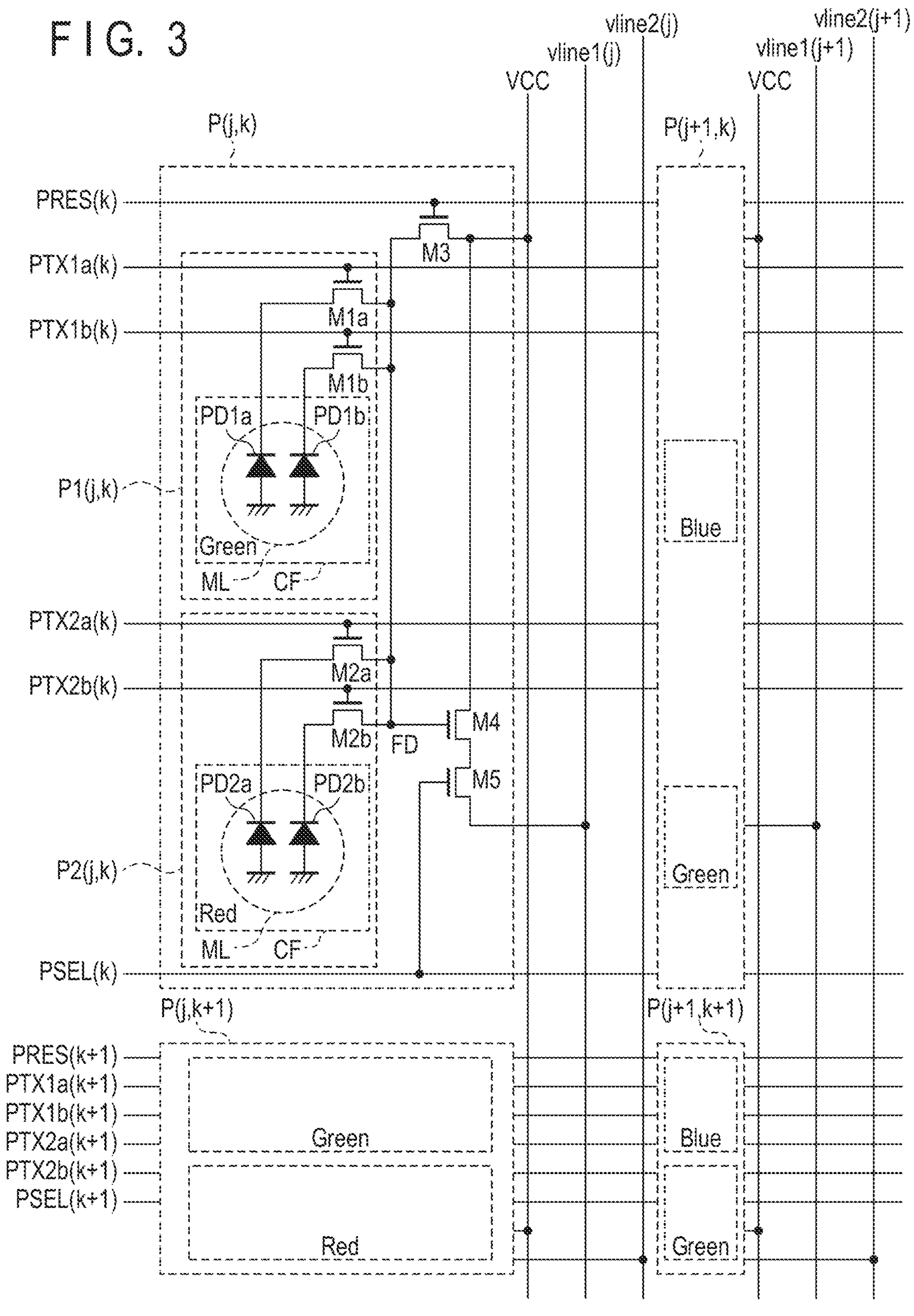
F I G. 3
vline2(j)
vline1(j)
VCC
vline2(j+1)
vline1(j+1)
VCC
P(j,k)
P(j+1,k)
PRES(k)
PTX1a(k)
PTX1b(k)
M3
M1a
M1b
PD1a
PD1b
P1(j,k)
Green
ML
CF
Blue
PTX2a(k)
PTX2b(k)
M2a
M2b
FD
M4
M5
PD2a
PD2b
P2(j,k)
Red
ML
CF
Green
PSEL(k)
P(j,k+1)
P(j+1,k+1)
PRES(k+1)
PTX1a(k+1)
PTX1b(k+1)
PTX2a(k+1)
PTX2b(k+1)
PSEL(k+1)
Green
Red
Blue
Green

FIG. 4

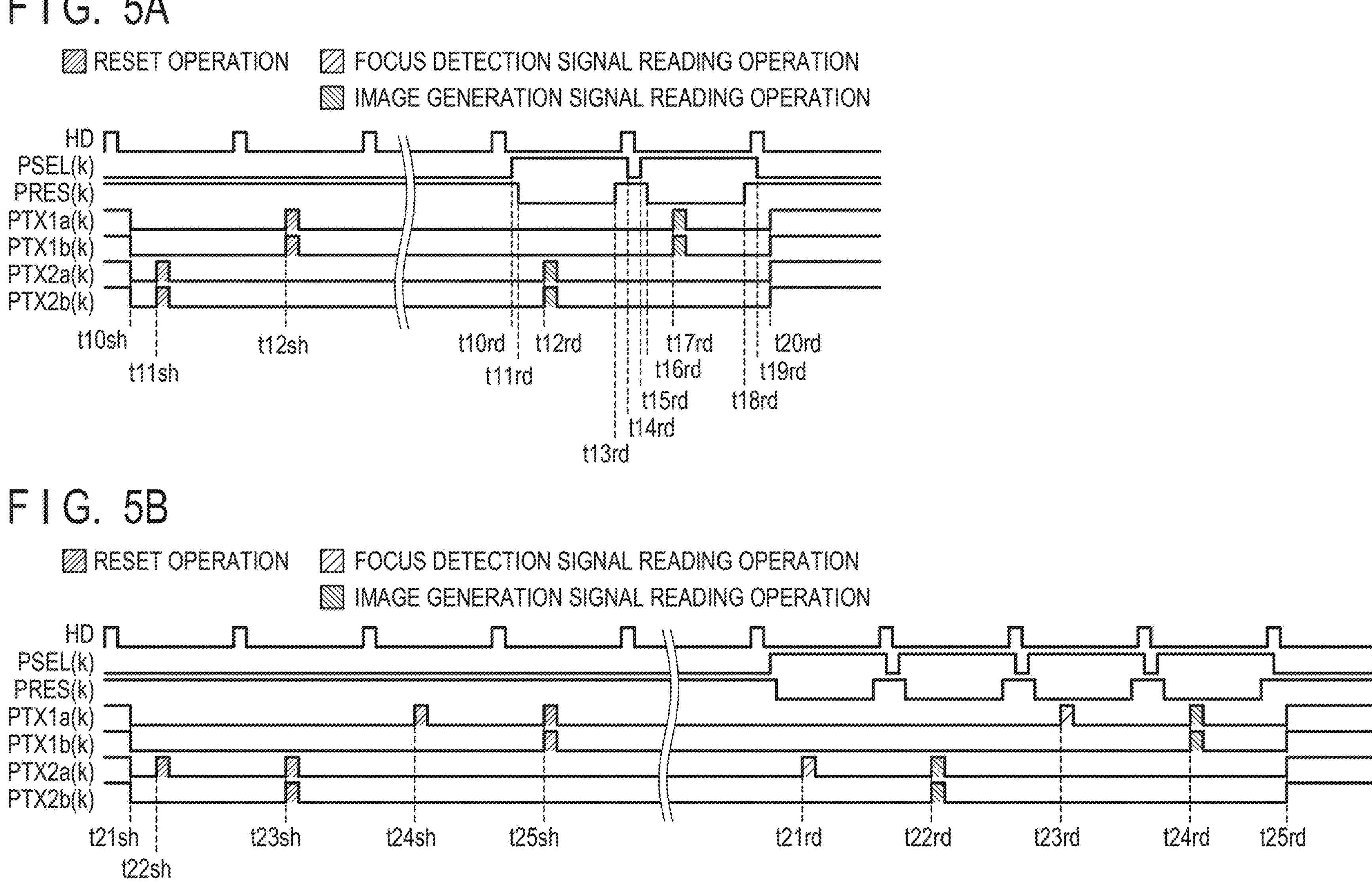
F I G. 5A
RESET OPERATION
FOCUS DETECTION SIGNAL READING OPERATION
IMAGE GENERATION SIGNAL READING OPERATION
HD
PSEL(k)
PRES(k)
PTX1a(k)
PTX1b(k)
PTX2a(k)
PTX2b(k)
t10sh
t11sh
t12sh
t10rd
t11rd
t12rd
t13rd
t14rd
t15rd
t16rd
t17rd
t18rd
t19rd
t20rd
F I G. 5B
RESET OPERATION
FOCUS DETECTION SIGNAL READING OPERATION
IMAGE GENERATION SIGNAL READING OPERATION
HD
PSEL(k)
PRES(k)
PTX1a(k)
PTX1b(k)
PTX2a(k)
PTX2b(k)
t21sh
t22sh
t23sh
t24sh
t25sh
t21rd
t22rd
t23rd
t24rd
t25rd

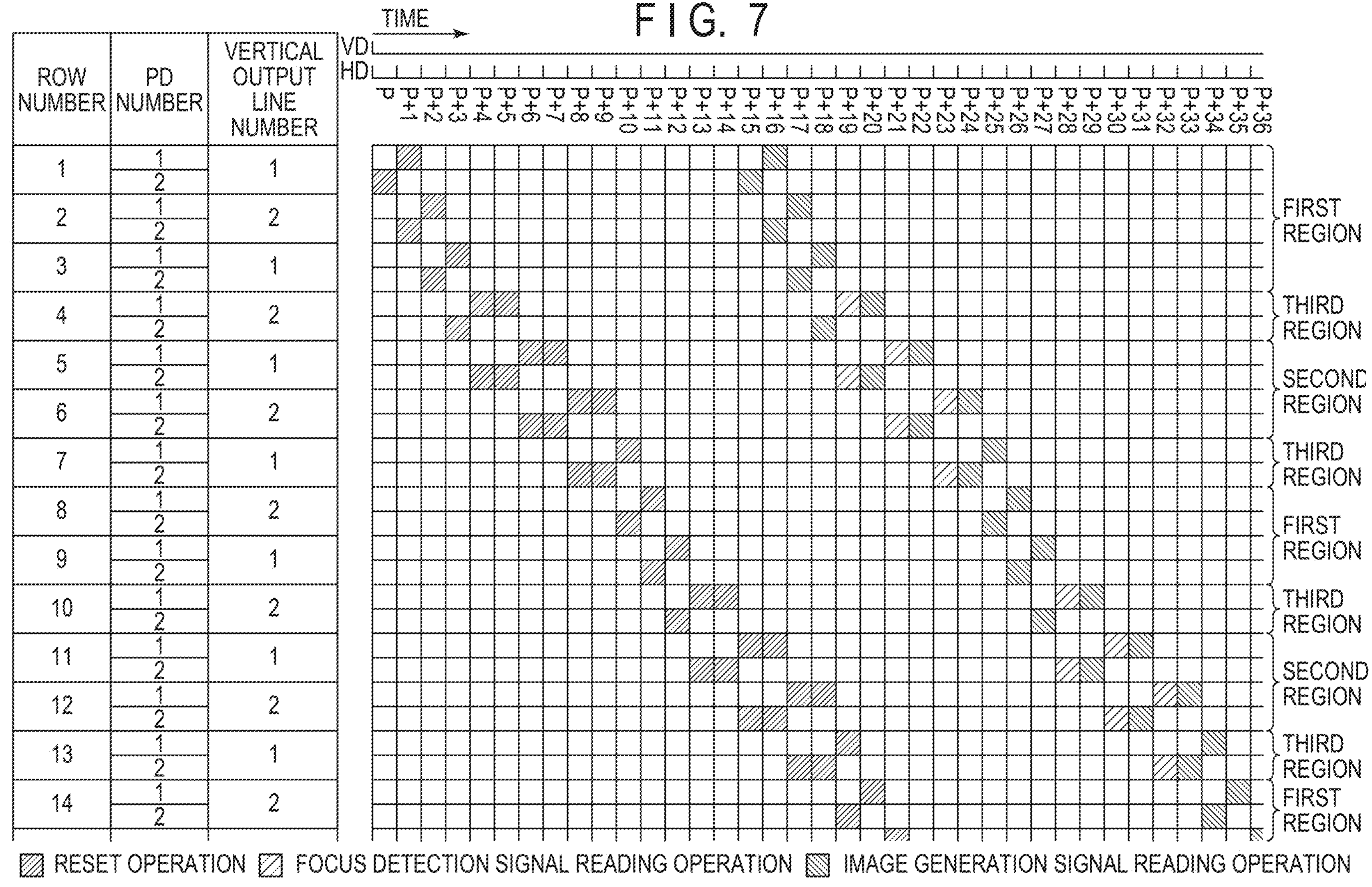
F I G. 7
TIME
VD
HD
ROW NUMBER
PD NUMBER
VERTICAL OUTPUT LINE NUMBER
P
P+1
P+2
P+3
P+4
P+5
P+6
P+7
P+8
P+9
P+10
P+11
P+12
P+13
P+14
P+15
P+16
P+17
P+18
P+19
P+20
P+21
P+22
P+23
P+24
P+25
P+26
P+27
P+28
P+29
P+30
P+31
P+32
P+33
P+34
P+35
P+36
FIRST REGION
THIRD REGION
SECOND REGION
THIRD REGION
FIRST REGION
THIRD REGION
SECOND REGION
THIRD REGION
FIRST REGION
RESET OPERATION
FOCUS DETECTION SIGNAL READING OPERATION
IMAGE GENERATION SIGNAL READING OPERATION FIRST REGION
RESET OPERATION
SIGNAL
REGION
READING OPERATION
SIGNAL
REGION
ab
a
THIRD REGION
SECOND REGION
FIRST REGION
HD
k1-TH ROW
PSEL(k1)
PRES(k1)
PTX1a(k1)
PTX1b(k1)
PTX2a(k1)
PTX2b(k1)
(k1+1)-TH ROW
PSEL(k1+1)
PRES(k1+1)
PTX1a(k1+1)
PTX1b(k1+1)
PTX2a(k1+1)
PTX2b(k1+1)
(k1+2)-TH ROW
PSEL(k1+2)
PRES(k1+2)
PTX1a(k1+2)
PTX1b(k1+2)
PTX2a(k1+2)
PTX2b(k1+2)
FIRST REGION
THIRD REGION
SECOND REGION
t34sh
t34rd

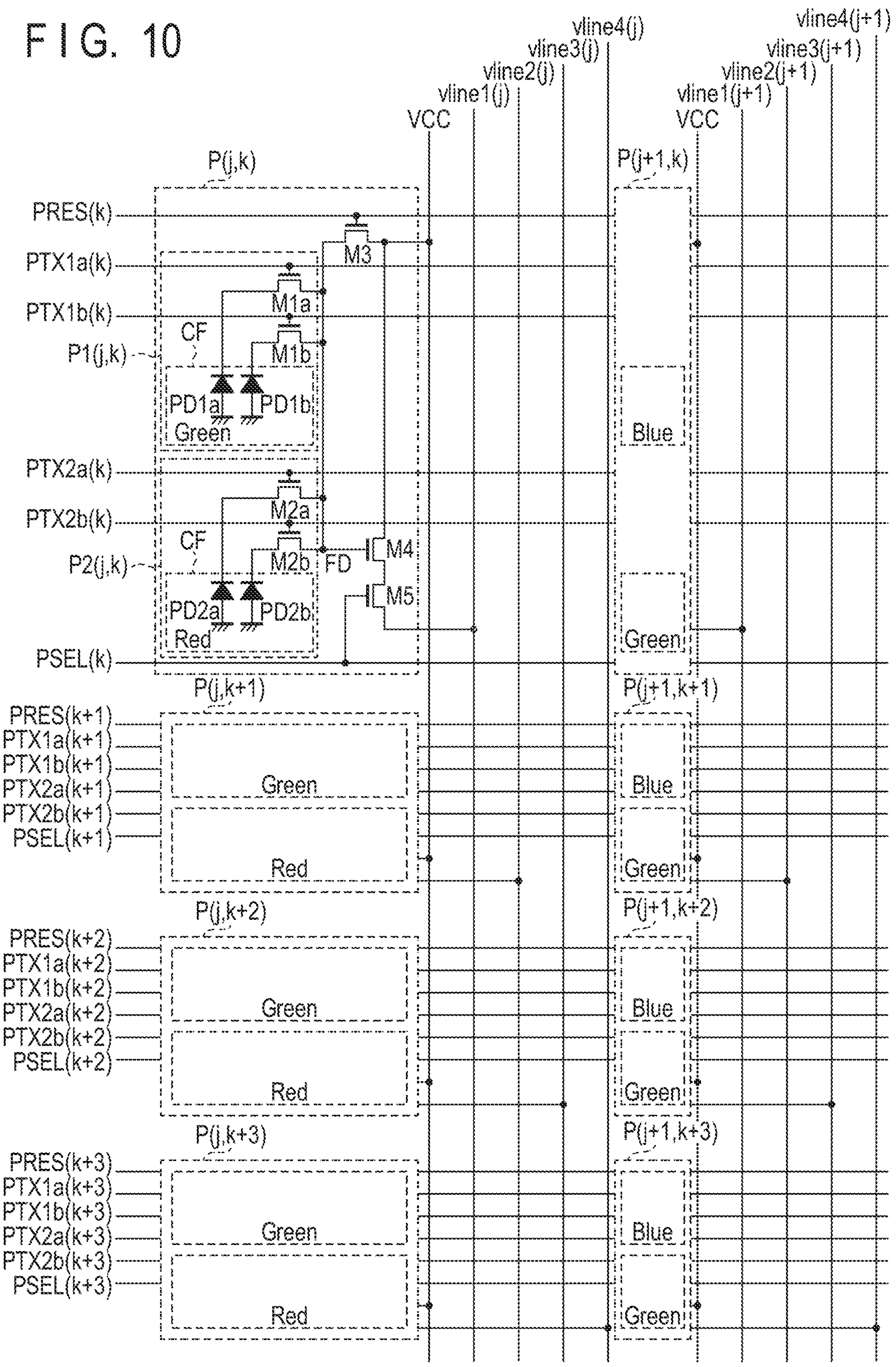
F I G. 10
vline4(j)
vline3(j)
vline2(j)
vline1(j)
VCC
vline4(j+1)
vline3(j+1)
vline2(j+1)
vline1(j+1)
VCC
P(j,k)
P(j+1,k)
PRES(k)
PTX1a(k)
PTX1b(k)
P1(j,k)
CF
M3
M1a
M1b
PD1a
PD1b
Green
Blue
PTX2a(k)
PTX2b(k)
P2(j,k)
CF
M2a
M2b
FD
M4
M5
PD2a
PD2b
Red
Green
PSEL(k)
P(j,k+1)
P(j+1,k+1)
PRES(k+1)
PTX1a(k+1)
PTX1b(k+1)
PTX2a(k+1)
PTX2b(k+1)
PSEL(k+1)
Green
Blue
Red
Green
P(j,k+2)
P(j+1,k+2)
PRES(k+2)
PTX1a(k+2)
PTX1b(k+2)
PTX2a(k+2)
PTX2b(k+2)
PSEL(k+2)
Green
Blue
Red
Green
P(j,k+3)
P(j+1,k+3)
PRES(k+3)
PTX1a(k+3)
PTX1b(k+3)
PTX2a(k+3)
PTX2b(k+3)
PSEL(k+3)
Green
Blue
Red
Green CPU
CONTROL UNIT
VERTICAL SCANNING UNIT
PIXEL ARRAY
COLUMN CIRCUIT UNIT
HORIZONTAL SCANNING UNIT
DIGITAL SIGNAL PROCESSING UNIT
LINE MEMORY UNIT
SIGNAL OUTPUT UNIT
1
2
3
4
5
6
7
8
9
P(1, 1)
P(1, n)
P(m, 1)
P(m, n)
vline1(1)
vline2(1)
vline1(m)
vline2(m)

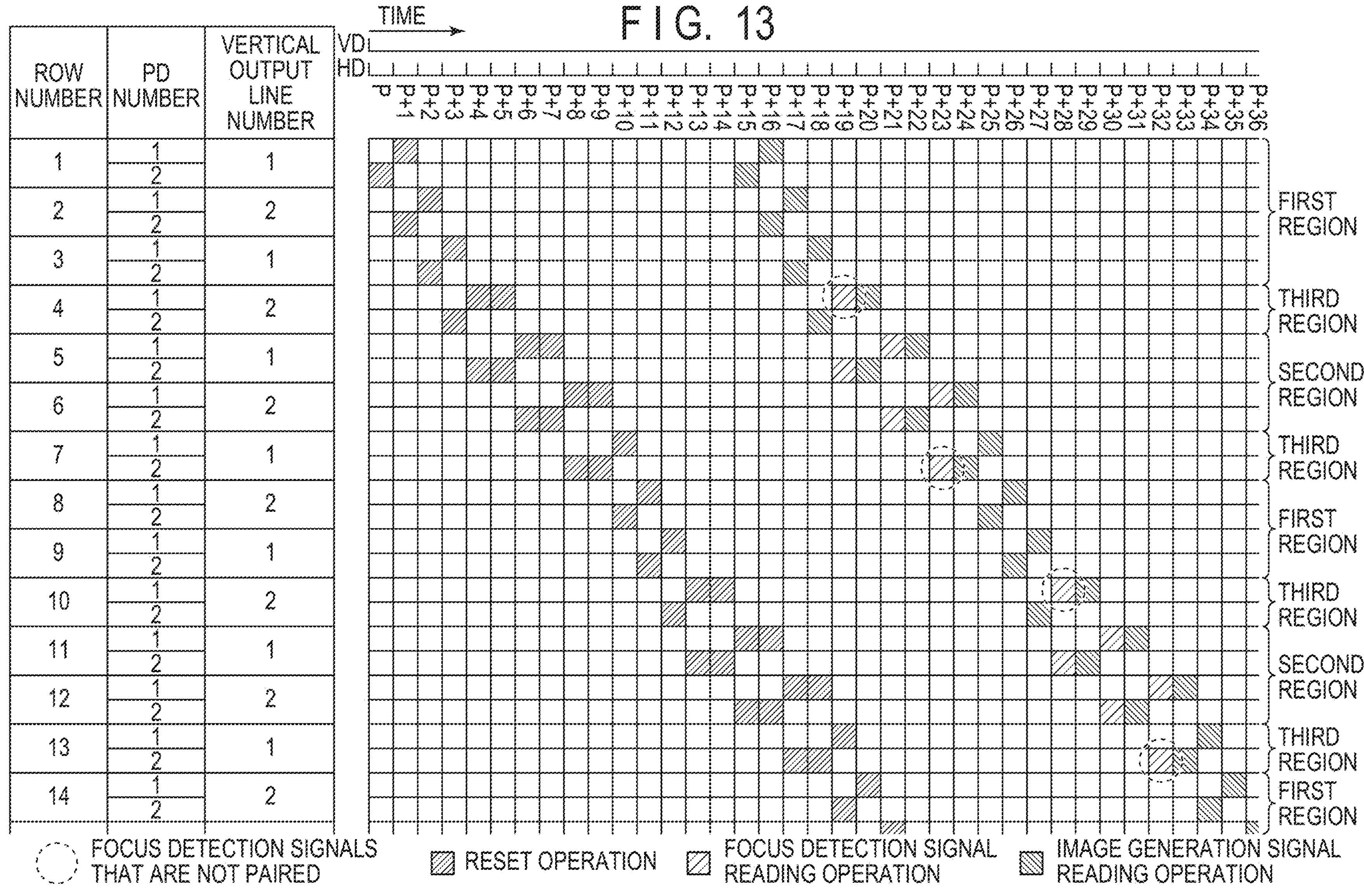
FIG. 13
TIME
ROW NUMBER
PD NUMBER
VERTICAL OUTPUT LINE NUMBER
VD
HD
P
P+1
P+2
P+3
P+4
P+5
P+6
P+7
P+8
P+9
P+10
P+11
P+12
P+13
P+14
P+15
P+16
P+17
P+18
P+19
P+20
P+21
P+22
P+23
P+24
P+25
P+26
P+27
P+28
P+29
P+30
P+31
P+32
P+33
P+34
P+35
P+36
FIRST REGION
THIRD REGION
SECOND REGION
THIRD REGION
FIRST REGION
THIRD REGION
SECOND REGION
THIRD REGION
FIRST REGION
FOCUS DETECTION SIGNALS THAT ARE NOT PAIRED
RESET OPERATION
FOCUS DETECTION SIGNAL READING OPERATION
IMAGE GENERATION SIGNAL READING OPERATION

Figure 14:
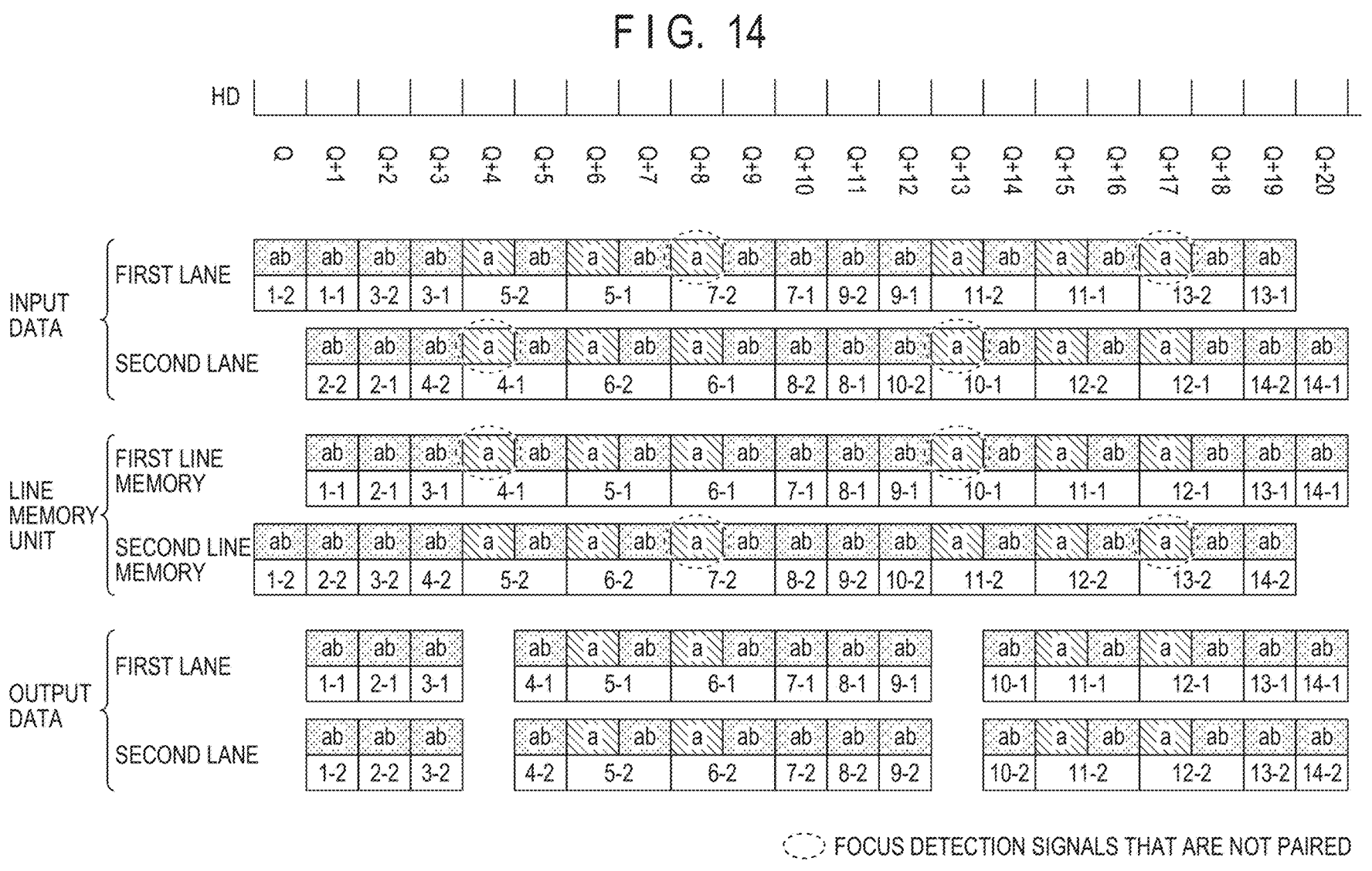

INPUT DATA: FIRST LANE, SECOND LANE

LINE MEMORY UNIT: FIRST LINE MEMORY, SECOND LINE MEMORY

OUTPUT DATA: FIRST LANE, SECOND LANE

FOCUS DETECTION SIGNALS THAT ARE NOT PAIRED

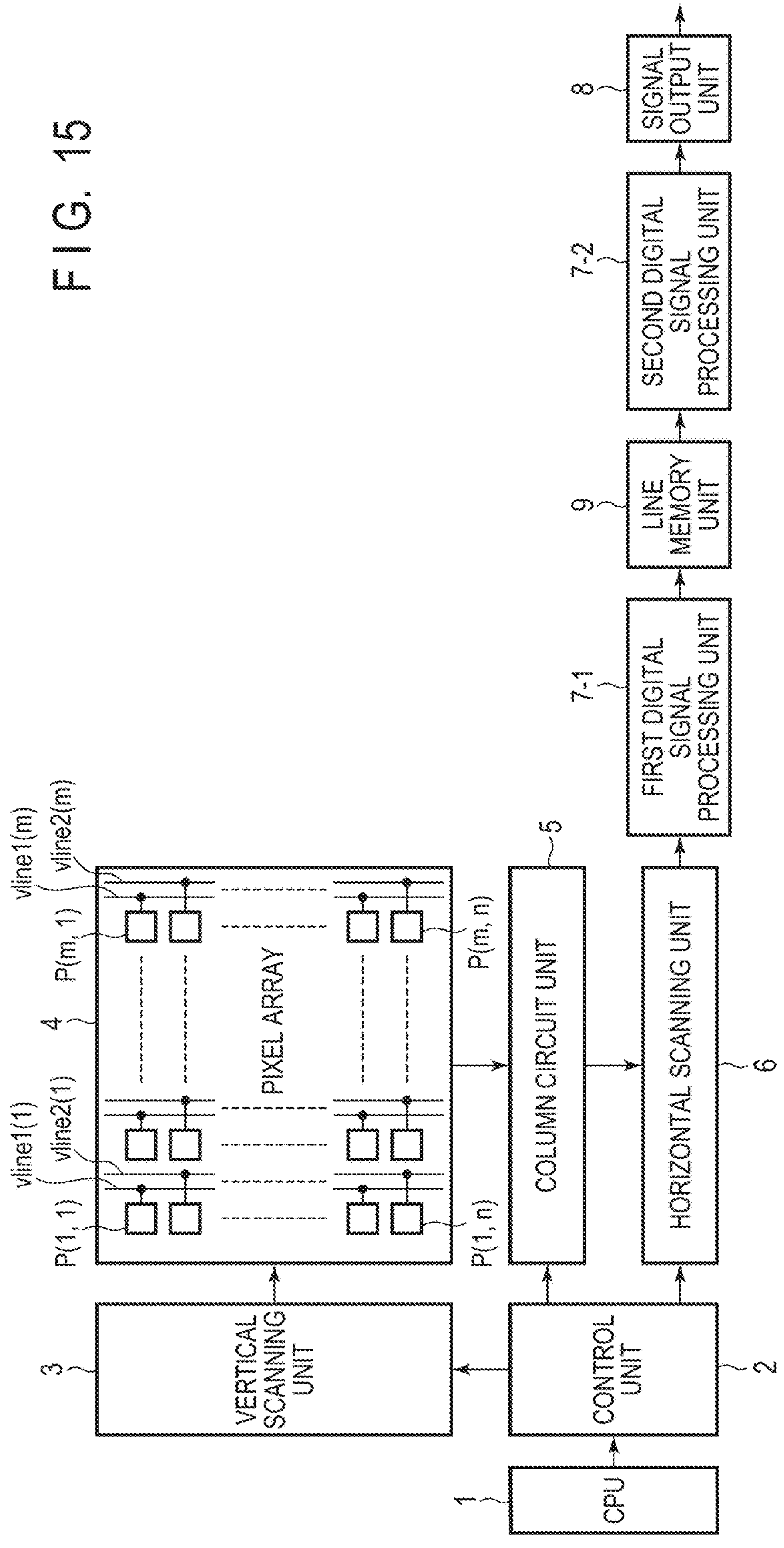
F I G. 15
CPU
1
CONTROL UNIT
2
VERTICAL SCANNING UNIT
3
PIXEL ARRAY
4
P(1, 1)
P(m, 1)
P(1, n)
P(m, n)
vline1(1)
vline2(1)
vline1(m)
vline2(m)
COLUMN CIRCUIT UNIT
5
HORIZONTAL SCANNING UNIT
6
FIRST DIGITAL SIGNAL PROCESSING UNIT
7-1
LINE MEMORY UNIT
9
SECOND DIGITAL SIGNAL PROCESSING UNIT
7-2
SIGNAL OUTPUT UNIT
8

80
850
810
VEHICLE INFORMATION ACQUISITION DEVICE
CONTROL ECU
ALERT DEVICE
830
820

PHOTOELECTRIC CONVERSION DEVICE

BACKGROUND OF THE INVENTION

Field of the Invention

The present disclosure relates to a photoelectric conversion device.

Description of the Related Art

Imaging systems such as a digital camera including a complementary metal-oxide-semiconductor (CMOS) image sensor which is an XY address type imaging device are becoming multifunctional. In addition to generation of an image such as a still image or a moving image, control of the imaging system such as focus adjustment may be performed based on object information obtained by an imaging device.

Japanese Patent Application Laid-Open No. 2001-124984 and Japanese Patent Application Laid-Open No. 2016-021052 disclose a technology capable of performing focus detection by a pupil division method using a signal obtained from an imaging device. As one microlens and two photodiodes are provided for each pixel of the imaging device, the two photodiodes receive rays of light that have passed through different pupil regions of a photographing lens. It is possible to perform focus detection by comparing output signals from the two photodiodes. Furthermore, it is also possible to generate an image by adding the output signals from the two photodiodes.

Furthermore, Japanese Patent Application Laid-Open No. 2016-021052 discloses a control method for separating a pixel region into a region in which acquisition of a signal for focus detection is performed and a region in which the acquisition of the signal for focus detection is not performed. According to the method, it is possible to suppress an increase in reading time for acquiring the signal for focus detection. In the configuration in which the region in which the acquisition of the signal for focus detection is performed and the region in which the acquisition of the signal for focus detection is not performed are separated as in Japanese Patent Application Laid-Open No. 2016-021052, accuracy of a focus detection signal may decrease depending on a scanning method for the regions.

SUMMARY OF THE INVENTION

An object of the present disclosure is to provide a photoelectric conversion device capable of acquiring a focus detection signal with favorable accuracy while suppressing an increase in reading time.

According to a disclosure of the present specification, there is provided a photoelectric conversion device including a plurality of microlenses arranged so as to form a plurality of rows and a plurality of columns, and a pixel array including a plurality of unit pixels arranged corresponding to the plurality of microlenses, respectively. Each of the plurality of unit pixels includes a first photoelectric conversion unit and a second photoelectric conversion unit. Reading from the pixel array is performed in a first mode in which a signal based on charges obtained by adding a charge generated in the first photoelectric conversion unit and a charge generated in the second photoelectric conversion unit is read, and a second mode in which a signal based on a charge generated in any one of the first photoelectric conversion unit and the second photoelectric conversion unit is read, and then a signal based on charges obtained by adding a charge generated in the first photoelectric conversion unit and a charge generated in the second photoelectric conversion unit is read. Reading control is performed on the pixel array, the pixel array being divided into a plurality of regions including a first region, a second region, and a third region arranged between the first region and the second region. Reading from unit pixels of all rows included in the first region is performed in the first mode. Reading from unit pixels of all rows included in the second region is performed in the second mode. Reading from unit pixels of some rows included in the third region is performed in the first mode, and reading from unit pixels of other rows is performed in the second mode.

Further features of the present invention will become apparent from the following description of exemplary embodiments with reference to the attached drawings.

BRIEF DESCRIPTION OF THE DRAWINGS

FIG. 1 is a block diagram illustrating a configuration example of an imaging device according to a first embodiment.

FIG. 3 is a circuit diagram illustrating a configuration example of a pixel group according to the first embodiment.

FIG. 4 is a schematic diagram illustrating a ranging region set for the pixel array according to the first embodiment.

FIGS. 5A and 5B are timing charts illustrating a reset operation and a reading operation of the pixel group according to the first embodiment.

FIG. 7 is a timing chart illustrating vertical scanning of the reset operation and the reading operation in the pixel array according to the first embodiment.

FIG. 10 is a circuit diagram illustrating a configuration example of a pixel group according to a second embodiment.

FIG. 13 is a timing chart illustrating vertical scanning of a reset operation and a reading operation in a pixel array according to the third embodiment.

FIG. 14 is a timing chart illustrating data input/output in a line memory unit according to the third embodiment.

FIG. 15 is a block diagram illustrating a configuration example of an imaging device according to a fourth embodiment.

DESCRIPTION OF THE EMBODIMENTS

Figure 2:
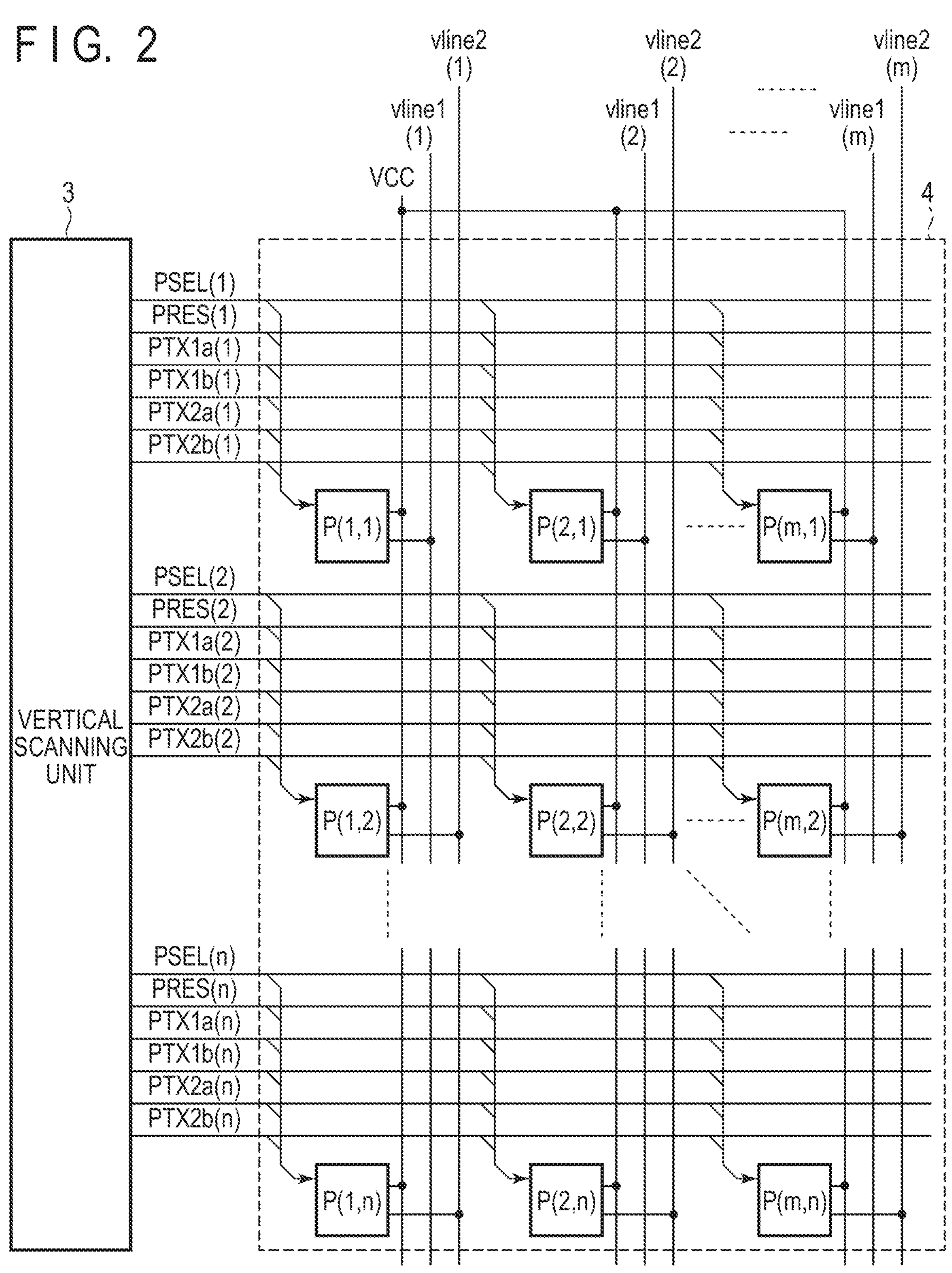
FIG. 2 is a block diagram illustrating a configuration example of a vertical scanning unit and a pixel array according to the first embodiment.

Preferred embodiments of the present invention will now be described in detail in accordance with the accompanying drawings. The same or corresponding elements are denoted by the same reference numerals throughout the drawings, and the description thereof may be omitted or simplified.

In first to fourth embodiments described below, an imaging device will be mainly described as an example of a photoelectric conversion device. However, the photoelectric conversion device in each embodiment is not limited to the imaging device, and can be applied to other devices. Examples of other devices include a ranging device and a photometric device. The ranging device can be, for example, a distance measurement device using time-of-flight (TOF). The photometric device can be a device that measures a light quantity of light incident on the device.

First Embodiment

FIG. 1 is a block diagram illustrating a configuration example of the imaging device according to the present embodiment. The imaging device includes a central processing unit (CPU) 1, a control unit 2, a vertical scanning unit 3, a pixel array 4, a column circuit unit 5, a horizontal scanning unit 6, a digital signal processing unit 7, and a signal output unit 8. Note that various circuits included in the photoelectric conversion device can be formed on one or more semiconductor substrates.

The CPU 1 is a processor that controls the imaging device by executing a program. The CPU 1 may be provided in the photoelectric conversion device, or may be provided in an imaging system on which the imaging device is mounted, that is, outside the imaging device.

The control unit 2 is a control circuit that receives a control signal such as a synchronization signal output from the CPU 1 and a setting signal indicating an operation mode or the like and supplies the control signal to the vertical scanning unit 3, the column circuit unit 5, and the horizontal scanning unit 6.

The vertical scanning unit 3 is a scanning circuit including a shift register, a gate circuit, a buffer circuit, and the like. The vertical scanning unit 3 receives control signals such as a vertical synchronization signal, a horizontal synchronization signal, and a clock signal from the control unit 2, and performs reset scanning and read scanning of the pixel array 4. The reset scanning is an operation of starting exposure by sequentially cancelling a reset state of photoelectric conversion units and transitioning the photoelectric conversion units to a charge accumulation state for pixels in some or all rows of the pixel array 4. Furthermore, the read scanning is an operation of sequentially outputting signals based on charges accumulated in the photoelectric conversion units to the pixels of some or all rows of the pixel array 4. The vertical scanning unit 3 corresponds to a drive device that outputs a drive signal for driving the pixel array 4 for each row to the pixel array 4.

The pixel array 4 includes a plurality of pixel groups P(1,1) to P(m,n) of n rows and m columns arranged so as to form a plurality of rows and a plurality of columns. In addition, the pixel array 4 includes a plurality of vertical output lines vline1(1) to vline1(*m*) of m columns and a plurality of vertical output lines vline2(1) to vline2(*m*) of m columns. In the present embodiment, two vertical output lines are arranged for one column, but three or more vertical output lines may be arranged for one column. Here, a row direction indicates a horizontal direction in the drawing, and a column direction indicates a vertical direction in the drawing. Furthermore, numerals in parentheses of the pixel group P(m,n) and the like indicate a column number and a row number in order. A numeral in parentheses of the vertical output line vline1(*m*) or the like indicates the column number. It is assumed that the row number of the uppermost row in FIG. 1 is the first row, and the column number of the leftmost column in FIG. 1 is the first column. In a case where it is not necessary to indicate the column number and the row number, numerals indicating the column number and the row number may be omitted. In the present embodiment, one pixel group P includes two unit pixels. A configuration of the unit pixel is described below.

Each of the plurality of pixel groups P includes the photoelectric conversion unit implemented by a photoelectric conversion element such as a photodiode (which may hereinafter be referred to as "PD"), and outputs a pixel signal corresponding to a light quantity of incident light. In the pixel array 4, an optical black pixel whose photoelectric conversion unit is shielded from light, a dummy pixel that does not output a signal, and the like may be arranged in addition to an effective pixel that outputs the pixel signal corresponding to the light quantity of the incident light.

The column circuit unit 5 can include an amplifier circuit, an analog-to-digital conversion circuit, and a memory. Each of the circuits can be arranged corresponding to each of the vertical output lines vline1(1) to vline1(*m*) and vline2(1) to vline2(*m*). The column circuit unit 5 amplifies a signal read from the pixel array 4, performs analog-to-digital conversion, and holds the signal in the memory as a digital signal.

The horizontal scanning unit 6 is a scanning circuit including a shift register, a gate circuit, a buffer circuit, and the like. The horizontal scanning unit 6 receives a control signal from the control unit 2, sequentially scans signals held in the memory of the column circuit unit 5, and outputs the signals to the digital signal processing unit 7.

The digital signal processing unit 7 executes digital signal processing on the signal output from the horizontal scanning unit 6. Examples of the digital signal processing executed by the digital signal processing unit 7 include processing of reducing various noises occurring in the pixel array 4, the column circuit unit 5, and the like.

The signal output unit 8 includes a digital processing unit, a parallel/serial conversion circuit, and an output circuit such as low voltage differential signaling (LVDS). The signal output unit 8 digitally processes a signal output from the digital signal processing unit 7 and outputs the processed signal as serial data to the outside of the imaging device.

FIG. 2 is a block diagram illustrating a configuration example of the vertical scanning unit 3 and the pixel array 4 according to the present embodiment. FIG. 2 illustrates signals input to the pixel array 4 in more detail.

The vertical scanning unit 3 outputs selection signals PSEL(1) to PSEL(n) and reset signals PRES(1) to PRES(n) to the pixel array 4. Further, the vertical scanning unit 3 outputs transfer signals PTX1*a*(1) to PTX1*a*(*n*), transfer signals PTX1*b*(1) to PTX1*b*(*n*), transfer signals PTX2*a*(1) to PTX2*a*(*n*), and transfer signals PTX2*b*(1) to PTX2*b*(*n*) to the pixel array 4. The control signals are supplied to a plurality of pixel groups P of a corresponding row via control lines arranged corresponding to the respective rows of the plurality of pixel groups P. Numerals in the parentheses indicate the row numbers.

Each of the plurality of pixel groups P of the pixel array 4 is electrically connected to a pixel power supply line VCC. In addition, each of the plurality of pixel groups P is electrically connected to the vertical output line vline1 or the vertical output line vline2. In the example of FIG. 2, each of the pixel groups P in odd-numbered rows is electrically connected to the vertical output line vline1, and each of the pixel groups P in even-numbered rows is electrically connected to the vertical output line vline2.

FIG. 3 is a circuit diagram illustrating a configuration example of the pixel group P according to the present embodiment. FIG. 3 illustrates four extracted pixel groups P(j,k), P(j+1,k), P(j,k+1), and P(j+1,k+1). The pixel group P(j,k) represents the pixel group P arranged in a k-th row and a j-th column of the pixel array 4.

The pixel group P(j,k) includes two unit pixels of a unit pixel P1(*j,k*) (first unit pixel) and a unit pixel P2(*j,k*) (second unit pixel) arranged so as to form two rows and one column. The unit pixel P1(*j,k*) and the unit pixel P2(*j,k*) are arranged in the same column and are adjacent to each other in the column. Furthermore, the pixel group P(j,k) includes a reset transistor M3, an amplification transistor M4, a selection transistor M5, and a floating diffusion FD. The unit pixel P1(*j,k*) includes photoelectric conversion units PD1*a* and PD1*b* (a first photoelectric conversion unit and a second photoelectric conversion unit) and transfer transistors M1*a* and M1*b*. The unit pixel P2(*j,k*) includes photoelectric conversion units PD2*a* and PD2*b* and transfer transistors M2*a* and M2*b*. The reset transistor M3, the amplification transistor M4, the selection transistor M5, and the floating diffusion FD are shared by the two unit pixels P1(*j,k*) and P2(*j,k*). That is, in the present embodiment, the pixel group P has a configuration in which four photoelectric conversion units share one floating diffusion FD. The number of photoelectric conversion units sharing the floating diffusion FD is not limited to four.

Each of the photoelectric conversion units PD1*a* to PD2*b* is a photoelectric conversion element that generates and accumulates a charge corresponding to the incident light by photoelectrically converting the incident light. One microlens ML and one color filter CF are arranged on an optical path of the incident light to the photoelectric conversion units PD1*a* and PD1*b*. That is, light having passed through the microlens ML and the color filter CF is incident on the photoelectric conversion units PD1*a* and PD1*b*. As described above, the microlens ML and the color filter CF are arranged so as to form a plurality of rows and a plurality of columns corresponding to each of the plurality of unit pixels P1 and P2.

As illustrated in FIG. 3, a green color filter CF is arranged in the unit pixel P1(*j,k*). That is, the unit pixel P1(*j,k*) is a pixel having sensitivity to green light. Similarly, a red color filter CF is arranged in the unit pixel P2(*j,k*). Further, a blue color filter CF is arranged in a unit pixel P1(*j*+1,k) of the pixel group P(j+1,k). A green color filter CF is arranged in a unit pixel P2(*j*+1,k) of the pixel group P(j+1,k). In this manner, the color filters CF arranged in the unit pixels P1 and P2 in the pixel array 4 form a so-called Bayer arrangement. The four unit pixels P1(*j,k*), P2(*j,k*), P1(*j*+1,k), and P2(*j*+1,k) are one unit of the Bayer arrangement, and the color filters CF of the other unit pixels also form a similar repetitive array.

Rays of light having passed through different pupil regions of an optical system are incident on the photoelectric conversion units PD1*a* and PD1*b*. A signal based on the charge generated in one of the photoelectric conversion units PD1*a* and PD1*b* can be used as a focus detection signal.

In addition, a signal based on charges obtained by adding the charge generated by the photoelectric conversion unit PD1*a* and the charge generated by the photoelectric conversion unit PD1*b* can be used as an image generation signal. Furthermore, it is possible to calculate the focus detection signal based on the charge generated by the photoelectric conversion unit PD1*b* by subtracting the focus detection signal based on the charge generated by the photoelectric conversion unit PD1*a* from the image generation signal.

Anodes of photodiodes forming the photoelectric conversion units PD1*a*, PD1*b*, PD2*a*, and PD2*b* are connected to a ground potential line. A cathode of the photodiode forming the photoelectric conversion unit PD1*a* is connected to a source of the transfer transistor M1*a*. A cathode of the photodiode forming the photoelectric conversion unit PD1*b* is connected to a source of the transfer transistor M1*b*. A cathode of the photodiode forming the photoelectric conversion unit PD2*a* is connected to a source of the transfer transistor M2*a*. A cathode of the photodiode forming the photoelectric conversion unit PD2*b* is connected to a source of the transfer transistor M2*b*.

Drains of the transfer transistors M1*a*, M1*b*, M2*a*, and M2*b* are connected to the floating diffusion FD which is a connection node between a source of the reset transistor M3 and a gate of the amplification transistor M4. A drain of the reset transistor M3 and a drain of the amplification transistor M4 are electrically connected to the pixel power supply line VCC. A source of the amplification transistor M4 is connected to a drain of the selection transistor M5.

A source of the selection transistor M5 is electrically connected to a current source (not illustrated) via the vertical output line vline1(*j*). As a result, the amplification transistor M4 and the current source operate as a source follower circuit. That is, the amplification transistor M4 functions as an output unit capable of outputting a signal corresponding to a potential of the floating diffusion FD to the vertical output line vline1(*j*). The floating diffusion FD includes a capacitance component (floating diffusion capacitance), and functions as a charge holding unit by the capacitance component.

The transfer signals PTX1*a*(*k*), PTX1*b*(*k*), PTX2*a*(*k*), and PTX2*b*(*k*) are input from the vertical scanning unit 3 to gates of the transfer transistors M1*a*, M1*b*, M2*a*, and M2*b*, respectively. The transfer transistors M1*a*, M1*b*, M2*a*, and M2*b* transfer the charges accumulated in the photoelectric conversion units PD1*a*, PD1*b*, PD2*a*, and PD2*b* to the floating diffusion FD based on the transfer signals. That is, each of the transfer transistors M1*a*, M1*b*, M2*a*, and M2*b* functions as a charge transfer unit. The floating diffusion FD holds the transferred charges.

A reset signal PRES(k) is input from the vertical scanning unit 3 to a gate of the reset transistor M3. The reset transistor M3 resets the potential of the floating diffusion FD to a predetermined potential based on the reset signal PRES(k).

A selection signal PSEL(k) is input from the vertical scanning unit 3 to a gate of the selection transistor M5. The selection signal PSEL(k) is a signal for selecting a row to which a signal is to be output, and the selection transistor M5 transitions to a conductive state or a non-conductive state based on the selection signal PSEL(k). Each transistor transitions to the conductive state when a control signal input to the gate is at a high level, and transitions to the non-conductive state when the control signal is at a low level.

When the transfer transistors M1*a*, Mb, M2*a*, and M2*b* are in the non-conductive state, the photoelectric conversion units PD1*a*, PD1*b*, PD2*a*, and PD2*b* transition to an exposure state of accumulating the charges generated by photoelectric conversion. When the transfer transistors M1*a*, M1*b*, M2*a*, and M2*b* are in the conductive state and the reset transistor M3 is in the conductive state, the photoelectric conversion units PD1*a*, PD1*b*, PD2*a*, and PD2*b* transition to a non-accumulation state in which no charge is accumulated, that is, the reset state. When any one of the transfer transistors M1*a*, M1*b*, M2*a*, and M2*b* is in the conductive state and the reset transistor M3 is in the non-conductive state, the corresponding photoelectric conversion unit transitions to a read state in which the charges can be transferred to the floating diffusion FD and read.

The pixel group P in the j-th column is connected to the vertical output line vline1(*j*) or the vertical output line vline2(*j*) in the j-th column. In the example of FIG. 3, the pixel group P(j,k) is connected to the vertical output line vline1(*j*), and the pixel group P(j,k+1) is connected to the vertical output line vline2(*j*). As described above, in the present embodiment, the pixel group P is alternately connected to the vertical output line vline1 and the vertical output line vline2 in a cycle of two rows. A connection relationship between the pixel group P and the vertical output lines vline1 and vline2 is not limited thereto, and may be appropriately modified according to the number of vertical output lines, for example.

In the present embodiment, each transistor is assumed to be an N-channel MOS transistor, but each transistor may also be a P-channel MOS transistor. In this case, a level and the like of each control signal can be appropriately changed.

Furthermore, in the present embodiment, an example in which the color filters CF form the Bayer arrangement is illustrated, but the present invention is not limited thereto. For example, an array of the color filters CF may be a quad Bayer arrangement.

Figure 4:
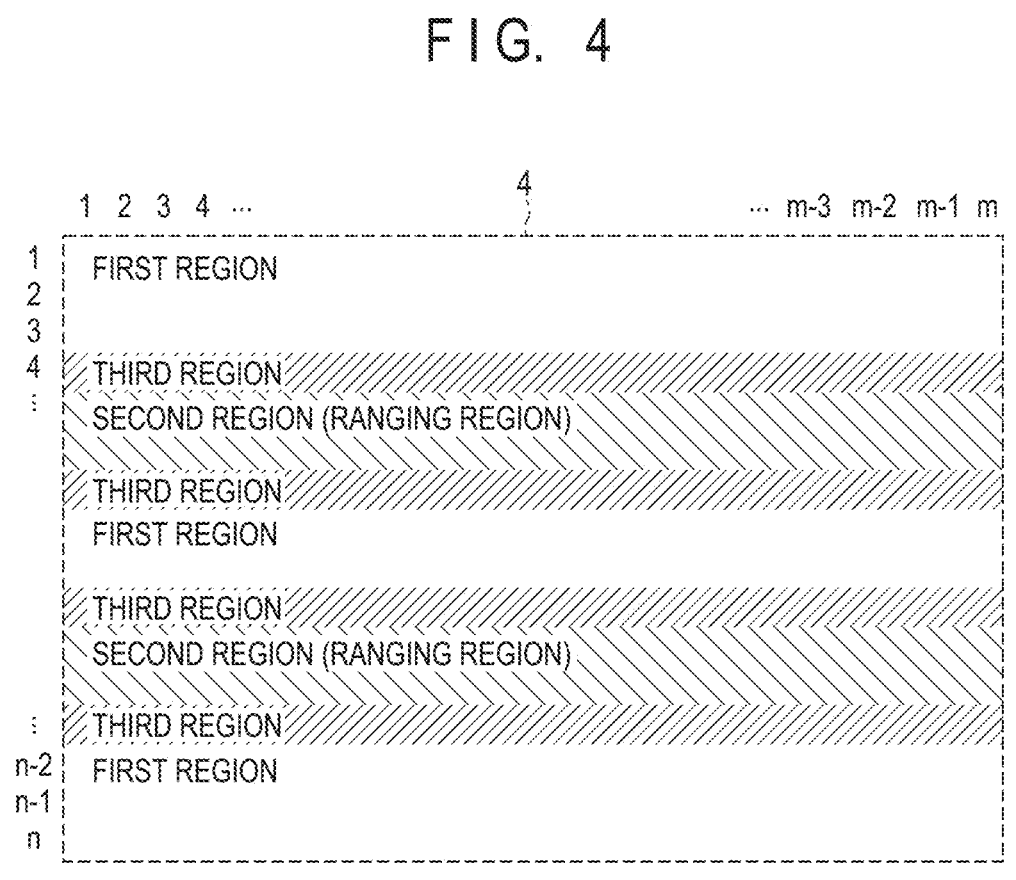

FIG. 4 is a schematic diagram illustrating a ranging region set in the pixel array 4 according to the present embodiment. As illustrated in FIG. 4, the pixel array 4 is divided into any one of a first region, a second region, and a third region for each row. The second region in FIG. 4 indicates the ranging region in which the focus detection signal is read. The ranging region may be variable, and in this case, a range of the ranging region can be set by the CPU 1. When the range of the ranging region is set by the CPU 1, the control unit 2 and the vertical scanning unit 3 generate a drive signal such that the set range becomes the ranging region, and supply the drive signal to the pixel array 4. Then, a region other than the ranging region is set as the first region or the third region. The third region is arranged between the first region and the second region.

An image generation signal 1*a*1*b* and an image generation signal 2*a*2*b* are read, and the focus detection signal is not read from the pixel group P included in the first region. Hereinafter, an operation of reading the image generation signal from the first region is referred to as an operation of a first mode. A focus detection signal 1*a*, the image generation signal 1*a*1*b*, a focus detection signal 2*a*, and the image generation signal 2*a*2*b* are read from the pixel group P included in the second region. Hereinafter, an operation of reading the focus detection signal and the image generation signal from the second region is referred to as an operation of a second mode. For the pixel group P included in the third region, the operation of the first mode is performed for some rows, and the operation of the second mode is performed for the other rows. A region operated in the first mode and a region operated in the second mode may be different in a plurality of frames. For example, the region operated in the first mode in a certain frame may be operated in the second mode in another frame. Furthermore, in a certain frame, a partial region of the pixel array 4 may be operated in the first mode, and the other partial region may be operated in the second mode, and in another frame, all of the regions of the pixel array 4 may be operated in only one of the first mode and the second mode.

Figure 6A:
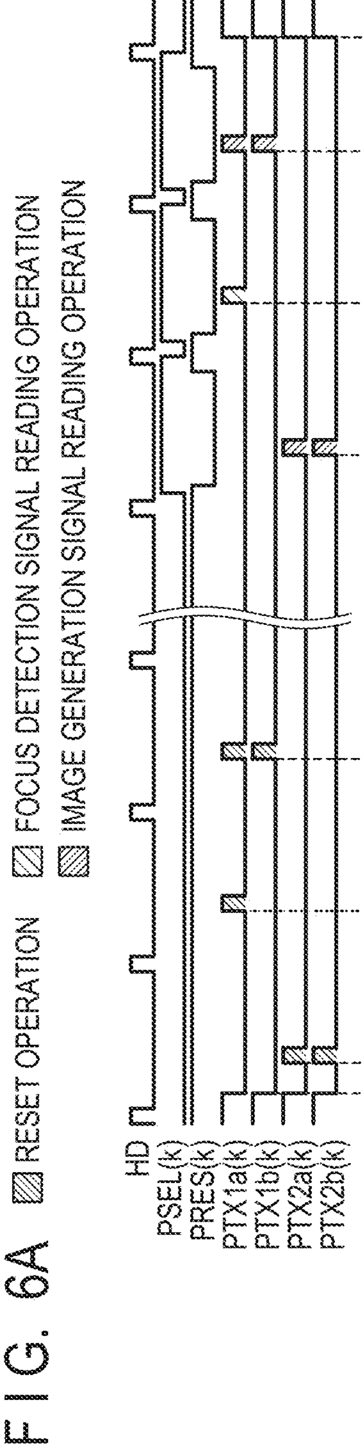
FIGS. 6A and 6B are timing charts illustrating the reset operation and the reading operation of the pixel group according to the first embodiment.
Figure 6B:
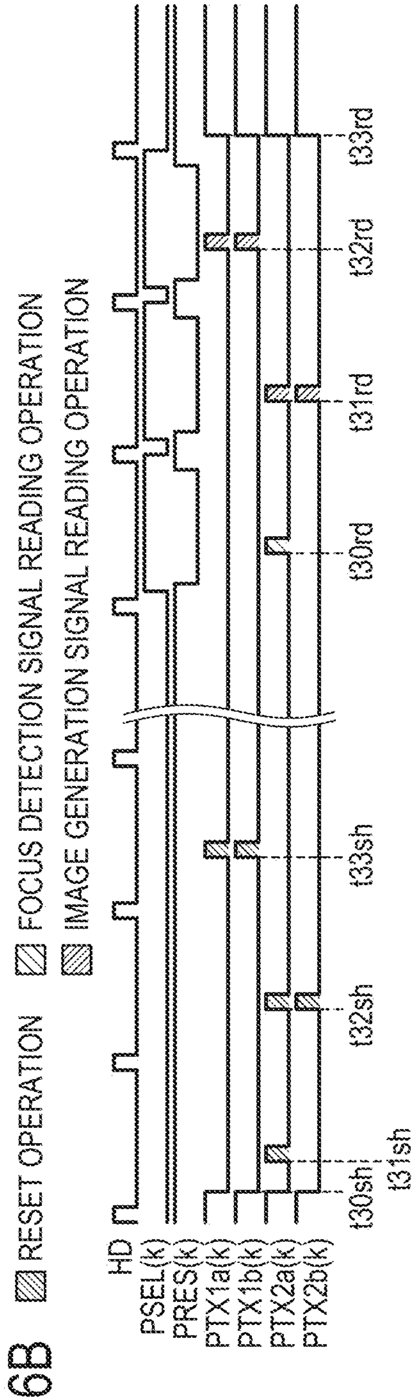

FIGS. 5A, 5B, 6A, and 6B are timing charts illustrating the reset operation and the reading operation of the pixel group P(j,k). FIG. 5A illustrates the operation of the first mode in the first region of FIG. 4, and FIG. 5B illustrates the operation of the second mode in the second region of FIG. 4. FIGS. 6A and 6B illustrate an operation in which the first mode and the second mode are mixed in the third region of FIG. 4.

FIGS. 5A, 5B, 6A, and 6B illustrate temporal changes of a horizontal synchronization signal HD, the selection signal PSEL(k), the reset signal PRES(k), and the transfer signals PTX1*a*(*k*), PTX1*b*(*k*), PTX2*a*(*k*), and PTX2*b*(*k*). First, the operation of the first mode will be described with reference to FIG. 5A.

At time t10*sh*, the transfer signals PTX1*a*(*k*), PTX1*b*(*k*), PTX2*a*(*k*), and PTX2*b*(*k*) transition to the low level. As a result, the transfer transistors M1*a*, M1*b*, M2*a*, and M2*b* are turned off.

At time t11*sh*, the transfer signals PTX2*a*(*k*) and PTX2*b*(*k*) transition to the high level. As a result, the transfer transistors M2*a* and M2*b* are turned on. By such an operation, the charges of the photoelectric conversion units PD2*a* and PD2*b* are discharged to the floating diffusion FD, and the photoelectric conversion units PD2*a* and PD2*b* are reset. At time t11*sh*, the reset signal PRES(k) is at the high level and the reset transistor M3 is in an on state, and thus, the floating diffusion FD is also reset. Thereafter, when the transfer signals PTX2*a*(*k*) and PTX2*b*(*k*) transition to the low level and the transfer transistors M2*a* and M2*b* transition to an off state, exposure of the photoelectric conversion units PD2*a* and PD2*b* is started.

Similarly, at time t12*sh*, the transfer signals PTX1*a*(*k*) and PTX1*b*(*k*) transition to the high level. As a result, the transfer transistors M1*a* and M1*b* are turned on. By such an operation, the charges of the photoelectric conversion units PD1*a* and PD1*b* are discharged to the floating diffusion FD, and the photoelectric conversion units PD1*a* and PD1*b* are reset. At time t12*sh*, the reset signal PRES(k) is at the high level and the reset transistor M3 is in the on state, and thus, the floating diffusion FD is also reset. Thereafter, when the transfer signals PTX1*a*(*k*) and PTX1*b*(*k*) transition to the low level and the transfer transistors M1*a* and M1*b* transition to the off state, exposure of the photoelectric conversion units PD1*a* and PD1*b* is started.

At time t10*rd*, the selection signal PSEL(k) transitions to the high level. As a result, the selection transistor M5 is turned on. By such an operation, the floating diffusion FD and the vertical output line vline1 are connected, and reading is started.

At time t11*rd*, the reset signal PRES(k) transitions to the low level. As a result, the reset transistor M3 is turned off. Such an operation cancels the reset of the floating diffusion FD.

At time t12*rd*, the transfer signal PTX2*a*(*k*) transitions to the high level. As a result, the transfer transistor M2*a* is turned on. By such an operation, a charge corresponding to the focus detection signal 2*a* is transferred from the photoelectric conversion unit PD2*a* to the floating diffusion FD.

Further, at the same time t12*rd*, the transfer signal PTX2*b*(*k*) transitions to the high level. As a result, the transfer transistor M2*b* is turned on. By such an operation, a charge corresponding to the focus detection signal 2*b* is transferred from the photoelectric conversion unit PD2*b* to the floating diffusion FD. The charge corresponding to the focus detection signal 2*a* and the charge corresponding to the focus detection signal 2*b* are added in the floating diffusion FD. The image generation signal 2*a*2*b* based on the charges added in this manner is read via the vertical output line vline1. The pixel group P(j,k) is assumed to be connected to the vertical output line vline1. However, the pixel group P(j,k) may be connected to the vertical output line vline2 depending on the row number as described above.

At time t13*rd*, the reset signal PRES(k) transitions to the high level. As a result, the reset transistor M3 is turned on. By such an operation, the floating diffusion FD is reset.

At time t14*rd*, the selection signal PSEL(k) transitions to the low level. As a result, the selection transistor M5 is turned off. By such an operation, the reading of the signal from the unit pixel P2 to the vertical output line vline1 ends.

At time t15*rd*, the selection signal PSEL(k) transitions to the high level. As a result, the selection transistor M5 is turned on again. Therefore, by such an operation, the floating diffusion FD and the vertical output line vline1 are connected, and reading is started.

At time t16*rd*, the reset signal PRES(k) transitions to the low level. As a result, the reset transistor M3 is turned off again. Such an operation cancels the reset of the floating diffusion FD.

At time t17*rd*, the transfer signal PTX1*a*(*k*) transitions to the high level. As a result, the transfer transistor M1*a* is turned on. By such an operation, a charge corresponding to the focus detection signal 1*a* is transferred from the photoelectric conversion unit PD1*a* to the floating diffusion FD.

Further, at the same time t17*rd*, the transfer signal PTX1*b*(*k*) transitions to the high level. As a result, the transfer transistor M1*b* is turned on. By such an operation, a charge corresponding to the focus detection signal 1*b* is transferred from the photoelectric conversion unit PD1*b* to the floating diffusion to the FD. The charge corresponding to the focus detection signal 1*a* and the charge corresponding to the focus detection signal 1*b* are added in the floating diffusion FD. The image generation signal 1*a*1*b* based on the charges added in this manner is read via the vertical output line vline1. At time t18*rd*, the reset signal PRES(k) transitions to the high level. As a result, the reset transistor M3 is turned on again. By such an operation, the floating diffusion FD is reset.

At time t19*rd*, the selection signal PSEL(k) transitions to the low level. As a result, the selection transistor M5 is turned off again. By such an operation, the reading of the signal from the unit pixel P1 to the vertical output line vline1 ends.

Finally, at time t20*rd*, the transfer signals PTX1*a*(*k*), PTX1*b*(*k*), PTX2*a*(*k*), and PTX2*b*(*k*) transition to the high level. As a result, the transfer transistors M1*a*, M1*b*, M2*a*, and M2*b* are turned on.

As described above, the reading operation of the pixel group P in the k-th row in the first mode is completed. The operation of the first mode is performed in units of one horizontal synchronization signal. In the operation of the first mode, the image generation signal 2*a*2*b* and the image generation signal 1*a*1*b* are sequentially read, but the focus detection signal is not read.

Next, the operation of the second mode will be described with reference to FIG. 5B. The operations of the reset signal PRES(k) and the selection signal PSEL(k) are substantially the same as those in FIG. 5A, and thus, the description thereof is omitted.

At time t21*sh*, the transfer signals PTX1*a*(*k*), PTX1*b*(*k*), PTX2*a*(*k*), and PTX2*b*(*k*) transition to the low level. As a result, the transfer transistors M1*a*, M1*b*, M2*a*, and M2*b* are turned off.

At time t22*sh*, the transfer signal PTX2*a*(*k*) transitions to the high level. As a result, the transfer transistor M2*a* is turned on. By such an operation, the charge of the photoelectric conversion unit PD2*a* is discharged to the floating diffusion FD, and the photoelectric conversion unit PD2*a* is reset.

At time t23*sh*, the transfer signals PTX2*a*(*k*) and PTX2*b*(*k*) transition to the high level. As a result, the transfer transistors M2*a* and M2*b* are turned on. By such an operation, the charges of the photoelectric conversion units PD2*a* and PD2*b* are discharged to the floating diffusion FD, and the photoelectric conversion units PD2*a* and PD2*b* are reset. Thereafter, when the transfer signals PTX2*a*(*k*) and PTX2*b*(*k*) transition to the low level and the transfer transistors M2*a* and M2*b* transition to the off state, exposure of the photoelectric conversion units PD2*a* and PD2*b* is started.

At time t24*sh*, the transfer signal PTX1*a*(*k*) transitions to the high level. As a result, the transfer transistor M1*a* is turned on. By such an operation, the charge of the photoelectric conversion unit PD1*a* is discharged to the floating diffusion FD, and the photoelectric conversion unit PD1*a* is reset.

At time t25*sh*, the transfer signals PTX1*a*(*k*) and PTX1*b*(*k*) transition to the high level. As a result, the transfer transistors M1*a* and M1*b* are turned on. By such an operation, the charges of the photoelectric conversion units PD1*a* and PD1*b* are discharged to the floating diffusion FD, and the photoelectric conversion units PD1*a* and PD1*b* are reset. Thereafter, when the transfer signals PTX1*a*(*k*) and PTX1*b*(*k*) transition to the low level and the transfer transistors M1*a* and M1*b* transition to the off state, exposure of the photoelectric conversion units PD1*a* and PD1*b* is started.

At time t21*rd*, the transfer signal PTX2*a*(*k*) transitions to the high level. As a result, the transfer transistor M2*a* is turned on. By such an operation, the charge corresponding to the focus detection signal 2*a* is transferred from the photoelectric conversion unit PD2*a* to the floating diffusion FD. Then, the focus detection signal 2*a* is read via the vertical output line vline1.

At time t22*rd*, the transfer signals PTX2*a*(*k*) and PTX2*b*(*k*) transition to the high level. As a result, the transfer transistors M2*a* and M2*b* are turned on. By such an operation, the charge corresponding to the focus detection signal 2*b* is further transferred from the photoelectric conversion unit PD2*b* to the floating diffusion FD. The charge corresponding to the focus detection signal 2*a* and the charge corresponding to the focus detection signal 2*b* are added in the floating diffusion FD. The image generation signal 2*a*2*b* based on the charges added in this manner is read via the vertical output line vline1. At time t23*rd*, the transfer signal PTX1*a*(*k*) transitions to the high level. As a result, the transfer transistor M1*a* is turned on. By such an operation, the charge corresponding to the focus detection signal 1*a* is transferred from the photoelectric conversion unit PD1*a* to the floating diffusion FD. Then, the focus detection signal 1*a* is read via the vertical output line vline1.

At time t24*rd*, the transfer signals PTX1*a*(*k*) and PTX1*b*(*k*) transition to the high level. As a result, the transfer transistors M1*a* and M1*b* are turned on. By such an operation, the charge corresponding to the focus detection signal 1*b* is further transferred from the photoelectric conversion unit PD1*b* to the floating diffusion FD. The charge corresponding to the focus detection signal 1*a* and the charge corresponding to the focus detection signal 1*b* are added in the floating diffusion FD. The image generation signal 1*a*1*b* based on the charges added in this manner is read via the vertical output line vline1.

Finally, at time t25*rd*, the transfer signals PTX1*a*(*k*), PTX1*b*(*k*), PTX2*a*(*k*), and PTX2*b*(*k*) transition to the high level. As a result, the transfer transistors M1*a*, M1*b*, M2*a*, and M2*b* are turned on.

As described above, the reading operation of the pixel group P in the k-th row in the second mode is completed. The operation of the second mode is performed in units of two horizontal synchronization signals. In the operation of the second mode, the focus detection signal 2*a*, the image generation signal 2*a*2*b*, the focus detection signal 1*a*, and the image generation signal 1*a*1*b* are sequentially read.

Next, an operation of a third mode will be described with reference to FIGS. 6A and 6B. FIGS. 6A and 6B illustrate two types of operations in the third mode. In a first example illustrated in FIG. 6A, the row of the unit pixel P1 to which the transfer signals PTX1*a*(*k*) and PTX1*b*(*k*) are input is operated in a second operation mode, and the row of the unit pixel P2 to which the transfer signals PTX2*a*(*k*) and PTX2*b*(*k*) are input is operated in a first operation mode. On the other hand, in a second example illustrated in FIG. 6B, the row of the unit pixel P1 to which the transfer signals PTX1*a*(*k*) and PTX1*b*(*k*) are input is operated in the first operation mode, and the row of the unit pixel P2 to which the transfer signals PTX2*a*(*k*) and PTX2*b*(*k*) are input is operated in the second operation mode.

First, the first example of the operation of the third mode will be described with reference to FIG. 6A. At time t26*sh*, the transfer signals PTX1*a*(*k*), PTX1*b*(*k*), PTX2*a*(*k*), and PTX2*b*(*k*) transition to the low level. As a result, the transfer transistors M1*a*, M1*b*, M2*a*, and M2*b* are turned off.

At time t27*sh*, the transfer signals PTX2*a*(*k*) and PTX2*b*(*k*) transition to the high level. As a result, the transfer transistors M2*a* and M2*b* are turned on. By such an operation, the charges of the photoelectric conversion units PD2*a* and PD2*b* are discharged to the floating diffusion FD, and the photoelectric conversion units PD2*a* and PD2*b* are reset. Thereafter, when the transfer signals PTX2*a*(*k*) and PTX2*b*(*k*) transition to the low level and the transfer transistors M2*a* and M2*b* transition to the off state, exposure of the photoelectric conversion units PD2*a* and PD2*b* is started.

At time t28*sh*, the transfer signal PTX1*a*(*k*) transitions to the high level. As a result, the transfer transistor M1*a* is turned on. By such an operation, the charge of the photoelectric conversion unit PD1*a* is discharged to the floating diffusion FD, and the photoelectric conversion unit PD1*a* is reset.

At time t29*sh*, the transfer signals PTX1*a*(*k*) and PTX1*b*(*k*) transition to the high level. As a result, the transfer transistors M1*a* and M1*b* are turned on. By such an operation, the charges of the photoelectric conversion units PD1*a* and PD1*b* are discharged to the floating diffusion FD, and the photoelectric conversion units PD1*a* and PD1*b* are reset. Thereafter, when the transfer signals PTX1*a*(*k*) and PTX1*b*(*k*) transition to the low level and the transfer transistors M1*a* and M1*b* transition to the off state, exposure of the photoelectric conversion units PD1*a* and PD1*b* is started.

At time t26*rd*, the transfer signal PTX2*a*(*k*) transitions to the high level. As a result, the transfer transistor M2*a* is turned on. By such an operation, the charge corresponding to the focus detection signal 2*a* is transferred from the photoelectric conversion unit PD2*a* to the floating diffusion FD.

Further, at the same time t26*rd*, the transfer signal PTX2*b*(*k*) transitions to the high level. As a result, the transfer transistor M2*b* is turned on. By such an operation, a charge corresponding to the focus detection signal 2*b* is transferred from the photoelectric conversion unit PD2*b* to the floating diffusion FD. The charge corresponding to the focus detection signal 2*a* and the charge corresponding to the focus detection signal 2*b* are added in the floating diffusion FD. The image generation signal 2*a*2*b* based on the charges added in this manner is read via the vertical output line vline1.

At time t27*rd*, the transfer signal PTX1*a*(*k*) transitions to the high level. As a result, the transfer transistor M1*a* is turned on. By such an operation, the charge corresponding to the focus detection signal 1*a* is transferred from the photoelectric conversion unit PD1*a* to the floating diffusion FD. Then, the focus detection signal 1*a* is read via the vertical output line vline1.

At time t28*rd*, the transfer signals PTX1*a*(*k*) and PTX1*b*(*k*) transition to the high level. As a result, the transfer transistors M1*a* and M1*b* are turned on. By such an operation, the charge corresponding to the focus detection signal 1*b* is further transferred from the photoelectric conversion unit PD1*b* to the floating diffusion FD. The charge corresponding to the focus detection signal 1*a* and the charge corresponding to the focus detection signal 1*b* are added in the floating diffusion FD. The image generation signal 1*a*1*b* based on the charges added in this manner is read via the vertical output line vline1.

Finally, at time t29*rd*, the transfer signals PTX1*a*(*k*), PTX1*b*(*k*), PTX2*a*(*k*), and PTX2*b*(*k*) transition to the high level. As a result, the transfer transistors M1*a*, M1*b*, M2*a*, and M2*b* are turned on.

As described above, the reading operation of the pixel group P in the k-th row according to the first example of the third mode is completed. In the operation of the first example of the third mode, the image generation signal 2*a*2*b*, the focus detection signal 1*a*, and the image generation signal 1*a*1*b* are sequentially read, and the focus detection signal 2*a* is not read.

Next, the second example of the operation of the third mode will be described with reference to FIG. 6B. In the first example of FIG. 6A, the row of the unit pixel P1 is operated in the second operation mode, and the row of the unit pixel P2 is operated in the first operation mode. On the other hand, in the second example of FIG. 6B, the row of the unit pixel P1 is operated in the first operation mode, and the row of the unit pixel P2 is operated in the second operation mode. Since the other points are similar, the description of the second example will be simplified as appropriate.

The exposure of the photoelectric conversion units PD2*a* and PD2*b* is started at time t32*sh*, and the exposure of the photoelectric conversion units PD1*a* and PD1*b* is started at time t33*sh*.

At time t30*rd*, the charge corresponding to the focus detection signal 2*a* is transferred from the photoelectric conversion unit PD2*a* to the floating diffusion FD. Then, the focus detection signal 2*a* is read via the vertical output line vline1.

At time t31*rd*, the charge corresponding to the focus detection signal 2*b* is further transferred from the photoelectric conversion unit PD2*b* to the floating diffusion FD. The charge corresponding to the focus detection signal 2*a* and the charge corresponding to the focus detection signal 2*b* are added in the floating diffusion FD. The image generation signal 2*a*2*b* based on the charges added in this manner is read via the vertical output line vline1.

At time t32*rd*, the charge corresponding to the focus detection signal 1*a* is transferred from the photoelectric conversion unit PD1*a* to the floating diffusion FD, and the charge corresponding to the focus detection signal 1*b* is transferred from the photoelectric conversion unit PD1*b* to the floating diffusion FD. The charge corresponding to the focus detection signal 1*a* and the charge corresponding to the focus detection signal 1*b* are added in the floating diffusion FD. The image generation signal 1*a*1*b* based on the charges added in this manner is read via the vertical output line vline1.

As described above, the reading operation of the pixel group P in the k-th row according to the second example of the third mode is completed. In the operation of the second example in the third mode, the focus detection signal 2*a*, the image generation signal 2*a*2*b*, and the image generation signal 1*a*1*b* are sequentially read, and the focus detection signal 1*a* is not read.

FIG. 7 is a timing chart illustrating vertical scanning of the reset operation and the reading operation in the pixel array 4 according to the present embodiment. FIG. 7 schematically illustrates the row number of the pixel group P, a PD number in each pixel group, the vertical output line number from which a signal is output, the first to third regions, timings of the reset operation and the reading operation, and the like.

In the table of FIG. 7, the vertical direction indicates a position in the row direction in the pixel array 4, and the horizontal direction indicates time. In "PD number" of FIG. 7, "1" indicates the unit pixel P1, and "2" indicates the unit pixel P2. In "vertical output line number" of FIG. 7, "1" indicates that a signal is output to the vertical output line vline1, and "2" indicates that a signal is output to the vertical output line vline2. "VD" and "HD" indicate input timings of pulses of the vertical synchronization signal VD and the horizontal synchronization signal HD, respectively. "P" to "P+36" indicate operation timing in units of the horizontal synchronization signal HD. Hatched frames in the table of FIG. 7 indicate unit pixels in which any one of the reset operation, a focus detection signal reading operation, and an image generation signal reading operation is performed, and timings thereof.

Focusing on a timing P+16, the image generation signal 1*a*1*b* is read from a unit pixel P1(*j*, 1) of the first region of which the row number is 1 and the PD number is 1 to the vertical output line vline1. At the same time, the image generation signal 2*a*2*b* is read from a unit pixel P2(*j*,2) of the first region of which the row number is 2 and the PD number is 2 to the vertical output line vline2. Focusing on a timing P+1, the reset operation corresponding to the reading operation at the timing P+16 is performed. That is, at the timing P+1, the unit pixel P1(*j*, 1) of which the row number is 1 and the PD number is 1 and the unit pixel P2(*j*,2) of which the row number is 2 and the PD number is 2 are reset.

As illustrated in FIG. 5A, the operation on the unit pixels P1 and P2 included in the first region is performed in units of one horizontal synchronization signal, and the row number and the PD number of the unit pixel to be processed transition. On the other hand, as illustrated in FIG. 5B, the operation on the unit pixels P1 and P2 included in the second region is performed in units of two horizontal synchronization signals, and the row number and the PD number of the unit pixel to be processed transition.

Focusing on a unit pixel P2(*j*,5) in the second region of which the row number is 5 and the PD number is 2, the focus detection signal 2*a* is read at a timing P+19, and the image generation signal 2*a*2*b* is read at a timing P+20. Here, attention is paid to the operations at the timing P+19 and the timing P+20.

At the timing P+19, the focus detection signal 1*a* is read from a unit pixel P1(*j*,4) of the third region of which the row number is 4 and the PD number is 1 to the vertical output line vline2. Further, at the same time, the focus detection signal 2*a* is read from the unit pixel P2(*j*,5) of the second region of which the row number is 5 and the PD number is 2 to the vertical output line vline1. All of the operations are in the second mode.

At the timing P+20, the image generation signal 1*a*1*b* is read from the unit pixel P1(*j*,4) of the third region of which the row number is 4 and the PD number is 1 to the vertical output line vline2. Further, at the same time, the image generation signal 2*a*2*b* is read from the unit pixel P2(*j*,5) of the second region of which the row number is 5 and the PD number is 2 to the vertical output line vline1. All of the operations are in the second mode.

In the third region of which the row number is 4, the unit pixel P1(*j*,4) of which the PD number is 1 is operated in the second mode, and the unit pixel P2(*j*,4) of which the PD number is 2 is operated in the first mode. As a result, at the timings P+19 and P+20, the operation of the unit pixel P1(*j*,4) in the third region and the operation of the unit pixel P2(*j*,5) in the second region can be the same as each other.

In a case where the third region is not provided, the third region in FIG. 7 is replaced with the first region. Therefore, a time required for reading the pixel array 4 is the same between a case where the third region is not provided and a case where the third region is provided. Therefore, even in a case where the third region is provided as in the present embodiment, the reading time does not increase as compared with a case where the third region is not provided.

Figure 8:
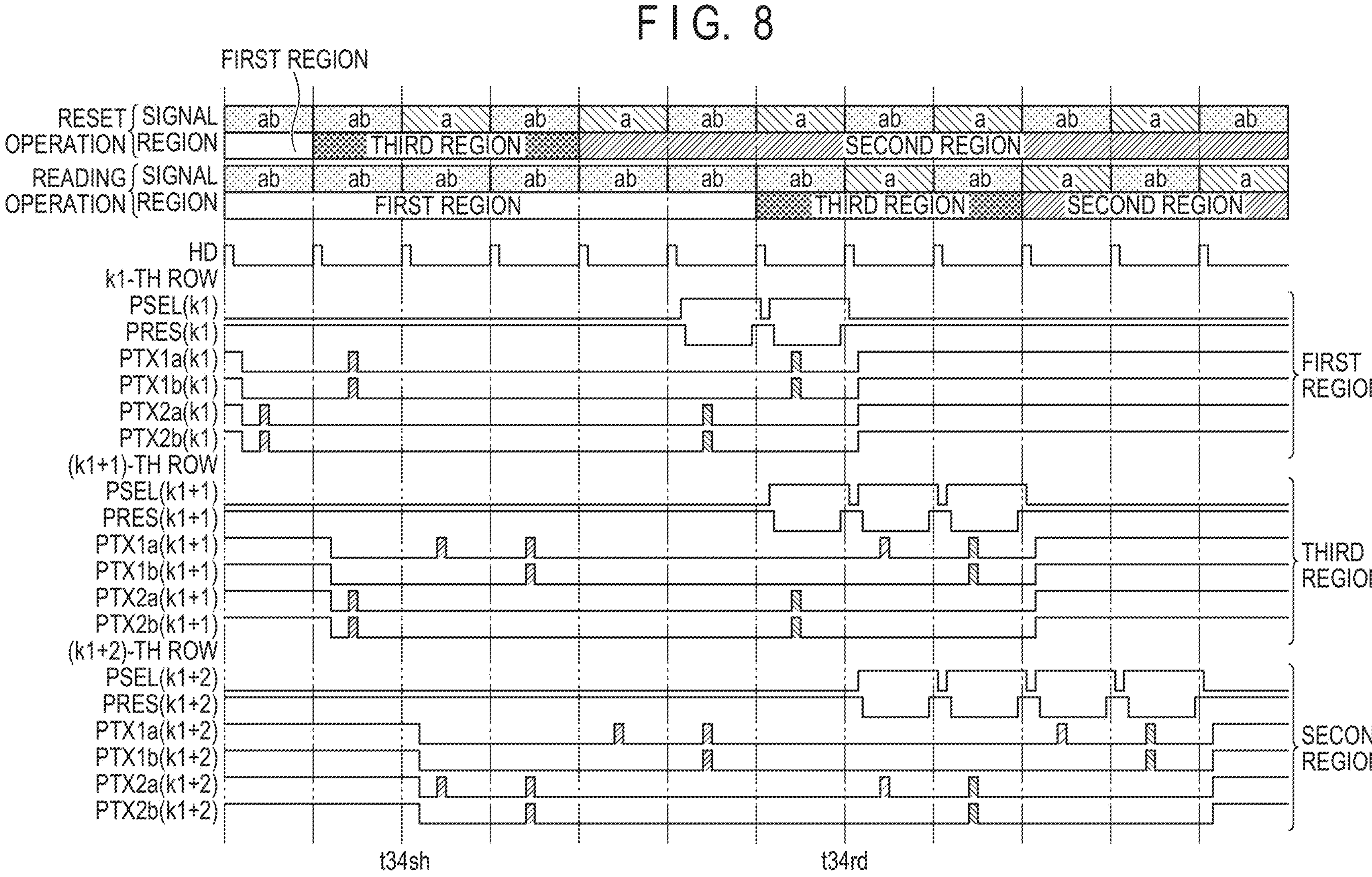
FIG. 8 is a timing chart illustrating the reset operation and the reading operation in each region according to the first embodiment.
Figure 9:
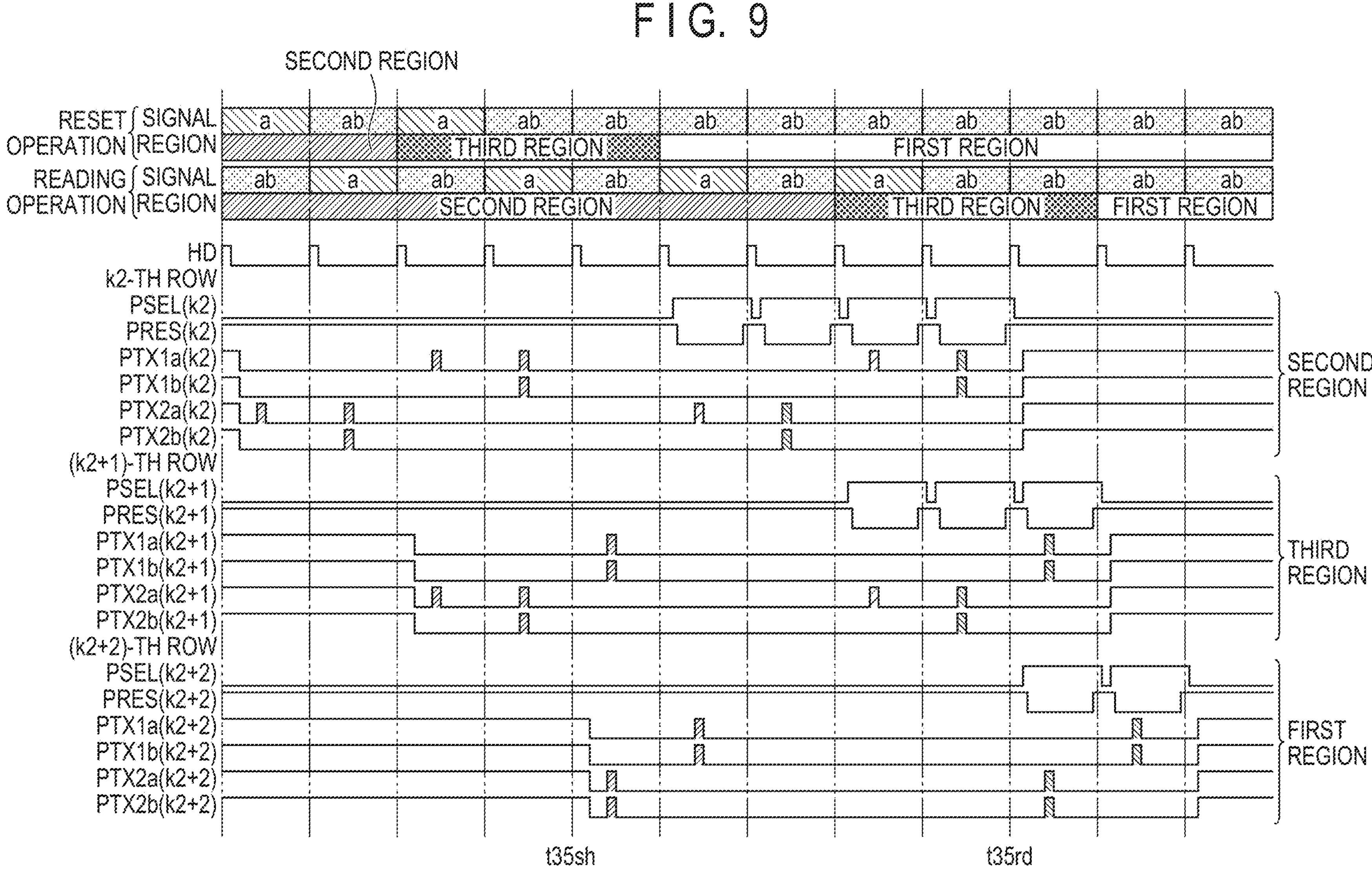
FIG. 9 is a timing chart illustrating the reset operation and the reading operation in each region according to the first embodiment.

FIGS. 8 and 9 are timing charts illustrating the reset operation and the reading operation in each region. FIGS. 8 and 9 are timing charts in which the reset operation and the reading operation illustrated in FIGS. 4 to 7 are summarized focusing on transition of a region in which the operation is to be performed.

In FIGS. 8 and 9, the timing charts of three consecutive rows(k1-th row to (k1+2)-th row or k2-th row to (k2+2)-th row) including the first to third regions are arranged in a transition order. A timing of a signal in each timing chart is similar to that illustrated in FIGS. 5A to 6B, and thus the description thereof is omitted. In addition, FIGS. 8 and 9 illustrate target signals and target regions in the reset operation and the reading operation. In "signal" of FIGS. 8 and 9, "a" indicates the focus detection signal, and "ab" indicates the image generation signal. Further, "region" in FIGS. 8 and 9 indicates the target region of the reset operation or the reading operation.

FIG. 8 illustrates an example of a case where the target region transitions to the first region, the third region, and the second region in this order in vertical scanning of three consecutive rows (the k1-th row, the (k1+1)-th row, and the (k1+2)-th row). This example corresponds to the third to fifth rows in FIG. 7.

Time t34*sh* indicates a time at which the reset operation is switched from the first mode to the second mode. The reset operation is performed in the first mode at a time before time t34*sh*, and the reset operation is performed in the second mode at a time after time t34*sh*.

Time t34*sh* is a time in the middle of the operation for the third region as indicated in a column of "reset operation" in FIG. 8. This indicates that a reset operation of the first mode and a reset operation of the second mode are mixed in the reset operation for the pixel group P in the third region.

Time t34*rd* indicates a time at which the reading operation is switched from the first mode to the second mode. The reading operation is performed in the first mode at a time before time t34*rd*, and the reading operation is performed in the second mode at a time after time t34*sh*.

Time t34*rd* is a time in the middle of the operation for the third region as indicated in a column of "reading operation" in FIG. 8. This indicates that a reading operation of the first mode and a reading operation of the second mode are mixed in the reading operation for the pixel group P in the third region.

FIG. 9 illustrates an example of a case where the target region transitions to the second region, the third region, and the first region in this order in vertical scanning of three consecutive rows (the k2-th row, the (k2+1)-th row, and the (k2+2)-th row). This example corresponds to the sixth to eighth rows in FIG. 7.

Time t35*sh* indicates a time at which the reset operation is switched from the second mode to the first mode. The reset operation is performed in the second mode at a time before time t35*sh*, and the reset operation is performed in the first mode at a time after time t35*sh*.

Time t35*sh* is a time in the middle of the operation for the third region as indicated in a column of "reset operation" in FIG. 9. This indicates that a reset operation of the first mode and a reset operation of the second mode are mixed in the reset operation for the pixel group P in the third region.

Time t35*rd* indicates a time at which the reading operation is switched from the second mode to the first mode. The reading operation is performed in the second mode at a time before time t35*rd*, and the reading operation is performed in the first mode at a time after time t35*sh*.

Time t35*rd* is a time in the middle of the operation for the third region as indicated in a column of "reading operation" in FIG. 9. This indicates that a reading operation of the first mode and a reading operation of the second mode are mixed in the reading operation for the pixel group P in the third region.

As another example of the configuration in which the first region where the image generation signal is read in the first mode and the second region where the focus detection signal and the image generation signal are read in the second mode are arranged in the pixel array 4, a configuration in which the third region according to the present embodiment is not provided can also be assumed. For example, when the third region is replaced with the first region in FIG. 7, the configuration can be modified to the configuration in which the third region is not provided. However, in such a configuration, a drive method in which the focus detection signal reading operation and the image generation signal reading operation are performed at the same time at read timings near a boundary between the first region and the second region is executed. In this case, since the image generation signal reading operation may affect quality of the focus detection signal obtained at the same time, accuracy of the focus detection may deteriorate.

On the other hand, in the present embodiment, the third region in which the reading operation of the first mode and the reading operation of the second mode are mixed is arranged between the first region and the second region. As a result, as illustrated in FIG. 7, the reading operations performed at the same time are only the image generation signal reading operations or only the focus detection signal reading operations. That is, a driving method in which the focus detection signal reading operation and the image generation signal reading operation are not performed at the same time during the transition between the first region and the second region is implemented. In addition, in the driving method, the time required for reading the pixel array 4 is the same between a case where the third region is not provided and a case where the third region is provided. Therefore, the reading time does not increase.

Therefore, according to the present embodiment, the photoelectric conversion device capable of acquiring the focus detection signal with favorable accuracy while suppressing an increase in reading time is provided.

Second Embodiment

An imaging device according to a second embodiment will be described with reference to FIGS. 10 and 11. The present embodiment is different from the first embodiment in the number of vertical output lines per column in a pixel array 4. In the present embodiment, a description of elements common to the first embodiment may be omitted or simplified.

FIG. 10 is a circuit diagram illustrating a configuration example of a pixel group P included in the pixel array 4 according to the present embodiment. In FIG. 10, eight pixel groups P(j,k), P(j+1,k), P(j,k+1), P(j+1,k+1), P(j,k+2), P(j+1,k+2), P(j,k+3), and P(j+1,k+3) are extracted and illustrated. The pixel group P(j,k) represents the pixel group P arranged in a k-th row and a j-th column of the pixel array 4. In addition to the configuration of the pixel array 4 according to the first embodiment, the pixel array 4 according to the present embodiment includes a vertical output line vline3 and a vertical output line vline4 for each column, and the number of vertical output lines arranged in one column is four. Although illustration of a microlens ML is omitted in FIG. 10, it is assumed that the microlens ML similar to that in FIG. 3 is arranged.

The pixel group P in the j-th column is connected to any one of vertical output lines vline1(*j*) to vline4 (*j*) in the j-th column. In the example of FIG. 10, the pixel group P(j,k) is connected to the vertical output line vline1(*j*), and the pixel group P(j,k+1) is connected to the vertical output line vline2(*j*). Furthermore, the pixel group P(j,k+2) is connected to the vertical output line vline3 (*j*), and the pixel group P(j,k+3) is connected to the vertical output line vline4 (*j*). As described above, in the present embodiment, the pixel groups P are sequentially connected from the vertical output line vline1 to the vertical output line vline4 in a cycle of four rows.

Figure 11:
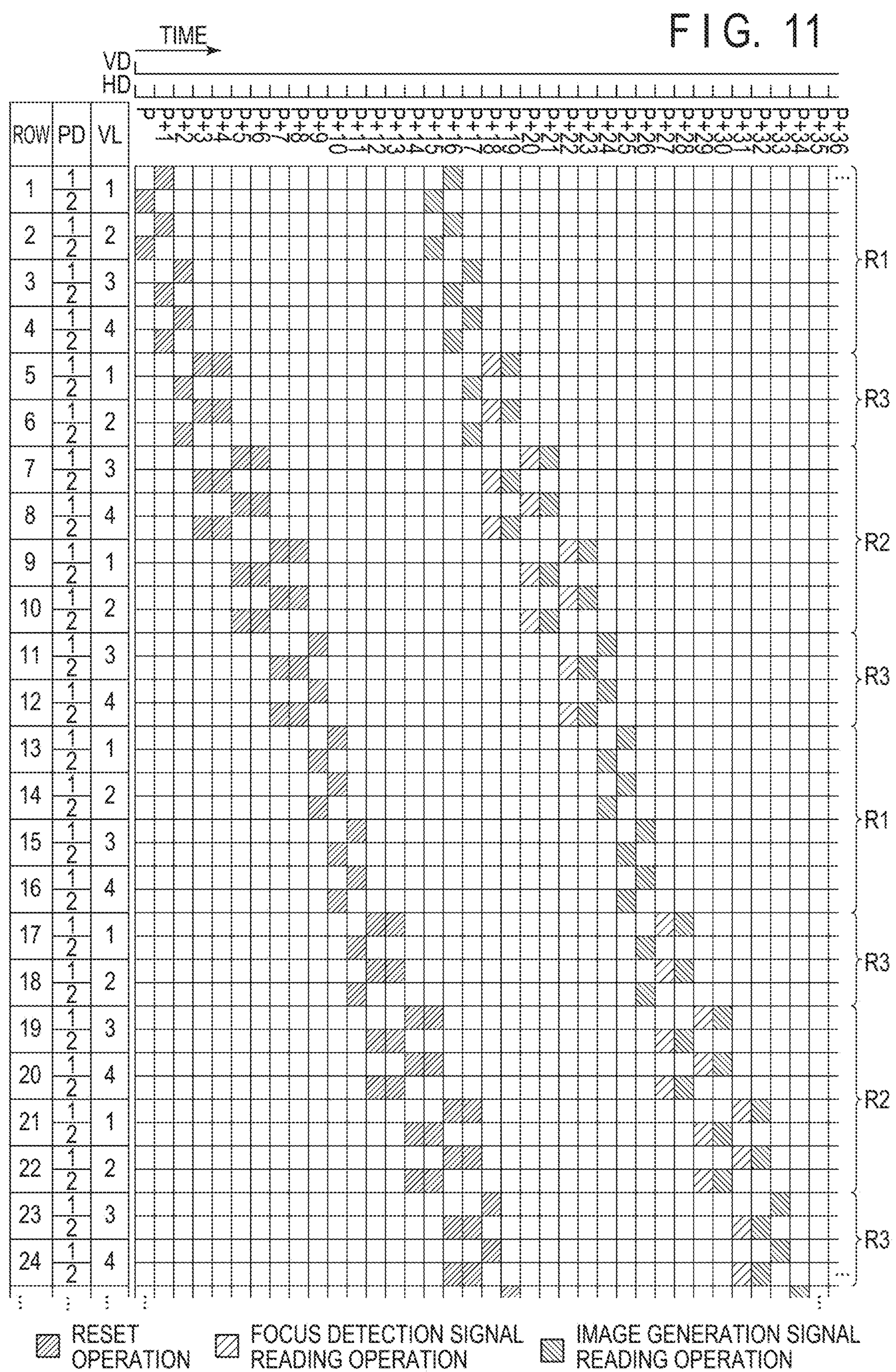
FIG. 11 is a timing chart illustrating vertical scanning of a reset operation and a reading operation in a pixel array according to the second embodiment.

FIG. 11 is a timing chart illustrating vertical scanning of a reset operation and a reading operation in the pixel array 4 according to the present embodiment. In FIG. 11, an order of the reset operation, a focus detection signal reading operation, and an image generation signal reading operation in each region is substantially the same as that in FIG. 7 according to the first embodiment. However, in FIG. 11, ranges of a first region, a second region, and a third region are changed from those in FIG. 7 according to the first embodiment in accordance with the change in the number of vertical output lines or the like. In FIG. 11, "row" indicates the row number, "PD" indicates the PD number, "VL" indicates the vertical output line number, "R1" indicates the first region, "R2" indicates the second region, and "R3" indicates the third region.

In the present embodiment, the third region includes the pixel groups P of two rows. For example, in FIG. 11, pixel groups P of two rows of which row numbers are 5 and 6 belong to the third region.

In the first embodiment, the third region includes the pixel group P of one row (that is, unit pixels P1 and P2 of two rows), but in the second embodiment, the third region includes the pixel groups P of two rows (that is, the unit pixels P1 and P2 of four rows). As described above, the third region may include a plurality of rows of pixel groups P depending on the number of vertical output lines.

In the present embodiment, similarly to the first embodiment, the third region in which a reading operation of a first mode and a reading operation of a second mode are mixed is arranged between the first region and the second region. As a result, as illustrated in FIG. 11, a driving method in which the focus detection signal reading operation and the image generation signal reading operation are not performed at the same time during transition between the first region and the second region is implemented. Therefore, also in the present embodiment, similarly to the first embodiment, a photoelectric conversion device capable of acquiring the focus detection signal with favorable accuracy while suppressing an increase in reading time is provided. In addition, in the present embodiment, since the number of vertical output lines arranged in one column is larger than that in the first embodiment, a reading speed can be increased.

The first embodiment illustrates a case where the number of vertical output lines arranged in one column is two, and the second embodiment illustrates a case where the number of vertical output lines arranged in one column is four. However, the number of vertical output lines is not limited thereto. That is, the number of vertical output lines arranged in one column may be two, three, or four or more.

Third Embodiment

An imaging device according to a third embodiment will be described with reference to FIGS. 12, 13, and 14. In the present embodiment, a configuration of the imaging device is different from that of the first embodiment. In the present embodiment, a description of elements common to the first embodiment may be omitted or simplified.

Figure 12:
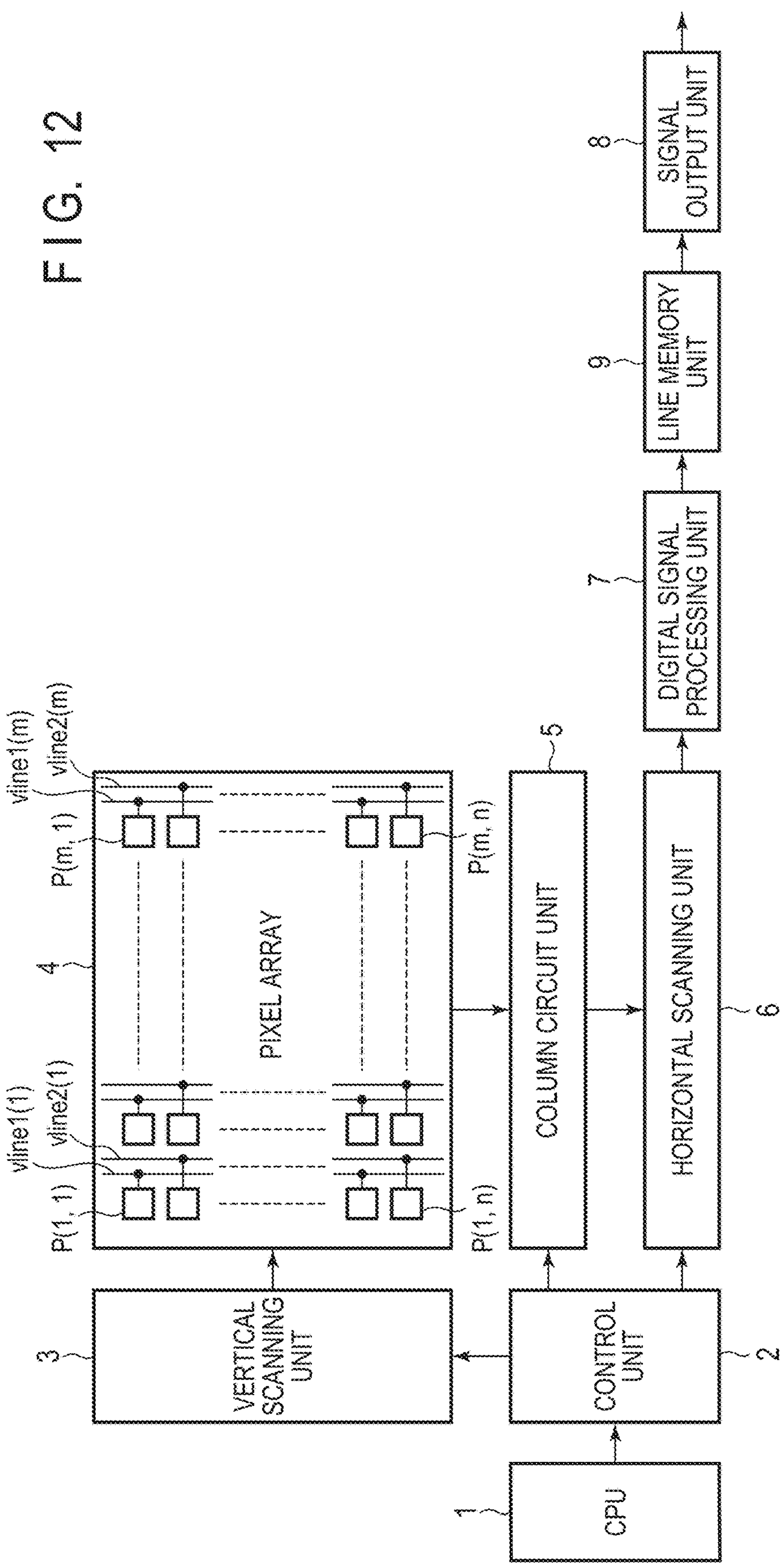
FIG. 12 is a block diagram illustrating a configuration example of an imaging device according to a third embodiment.

FIG. 12 is a block diagram illustrating a configuration example of the imaging device according to the present embodiment. The imaging device according to the present embodiment further includes a line memory unit 9 in addition to the configuration of the imaging device according to the first embodiment. As illustrated in FIG. 12, a digital signal processing unit 7 (first processing unit) is arranged at a preceding stage of the line memory unit 9, and a signal output unit 8 is arranged at a subsequent stage of the line memory unit 9. That is, an output signal of the digital signal processing unit 7 is input to the line memory unit 9, and an output signal of the line memory unit 9 is input to the signal output unit 8.

FIG. 13 is a timing chart illustrating vertical scanning of a reset operation and a reading operation in a pixel array 4 according to the present embodiment. In FIG. 13, arrangement of regions, a timing of the reset operation, a timing of a focus detection signal reading operation, a timing of an image generation signal reading operation, and the like are similar to those in FIG. 7 according to the first embodiment, and thus, the description thereof is omitted.

In reading a signal from a third region, an operation in which a focus detection signal is output from one of two unit pixels of one pixel group P, and the focus detection signal is not output from the other unit pixel can be performed. Therefore, a focus detection signal 1_a_ and a focus detection signal 2_a_ may not be output in pairs from one pixel group P arranged in the third region. In FIG. 13, acquisition timings for the focus detection signals that are not paired as described above are indicated by broken line circles.

For example, the focus detection signal 1_a_ is read from a unit pixel P1(_j_,4) of a first region of which a row number is 4 and a PD number is 1. However, the focus detection signal 2_a_ is not read from a unit pixel P2(_j_,4) paired with the unit pixel P1(_j_,4). Therefore, not both the focus detection signal 1_a_ and the focus detection signal 2_a_ are output signals of a pixel group P(j,4). The focus detection signals 1_a_ that is not paired as described above may not be used for focus detection processing in the subsequent stage because focus detection accuracy may not be sufficient. The line memory unit 9 according to the present embodiment has a function of thinning out and outputting the focus detection signals that are not paired as described above.

FIG. 14 is a timing chart illustrating data input/output in the line memory unit 9 according to the present embodiment. FIG. 14 schematically illustrates temporal changes of input data to the line memory unit 9, data held in the line memory unit 9, and output data from the line memory unit 9.

A timing Q in FIG. 14 is a timing at which the reset operation is performed at the timing P in FIG. 13 and then output data of a unit pixel P2(_j_,1) read at a timing P+15 is input to the line memory unit 9.

Notations such as "1-1" in FIG. 14 indicate the row number and the PD number, respectively. That is, "1-1" indicates output data from a unit pixel P1(_j_,1) of which the row number is 1 and the PD number is 1. "1-2" indicates output data from the unit pixel P2(_j_, 1) of which the row number is 1 and the PD number is 2. Furthermore, in FIG. 14, "a" indicates the focus detection signal, and "ab" indicates an image generation signal. Also in FIG. 14, similarly to FIG. 13, the focus detection signals that are not paired are indicated by broken line circles.

The line memory unit 9 has two data input paths (lanes). Data output from the pixel group P via a vertical output line vline1 is input from the digital signal processing unit 7 to a first lane of the line memory unit 9. Data output from the pixel group P via a vertical output line vline2 is input from the digital signal processing unit 7 to a second lane of the line memory unit 9. The input to the first lane and the input to the second lane can be performed in parallel.

The number of lanes of the line memory unit 9 is not limited to two. The number of lanes of the line memory unit 9 may be one or three or more. In addition, it is not essential that the input data to the line memory unit 9 is collected for each vertical output line, and the input data to the line memory unit 9 may be collected for each PD number, for example.

The line memory unit 9 includes two line memories. Data input to the line memory unit 9 is written to a first line memory and a second line memory. Data with the PD number of 1 is written to the first line memory, and data with the PD number of 2 is written to the second line memory. At this stage, the focus detection signals that are not paired are also written to the first line memory or the second line memory, similarly to other signals.

The line memory unit 9 has two data output paths (lanes). The data in the first line memory is output from a first lane of the line memory unit 9 to the outside via the signal output unit 8. The data in the second line memory is output from a second lane of the line memory unit 9 to the outside via the signal output unit 8. The output from the first lane and the output from the second lane can be performed in parallel.

When data is read from the first line memory and the second line memory, the focus detection signals that are not paired are not output. In a case where data of the focus detection signals that are not paired is written to the first line memory and the second line memory, such an operation can be implemented by deleting the data. Data deletion is not essential. For example, the line memory holding the data is not selected, and the signal is not read from the line memory. Thereafter, the data held by the line memory that is not selected may be overwritten by writing of the next data.

In addition, when data is read from the second line memory, a timing of reading a part of the input data is delayed as appropriate such that pieces of data of the same pixel group P are output at the same timing. As a result, it is possible to perform data sorting such that pieces of data of the same pixel group P read at different timings are collectively output.

Here, focusing on a timing Q+4 and a timing Q+13, since the data of the focus detection signals that are not paired is thinned out, data is not output from the line memory unit 9 at this timing.

As described above, in the present embodiment, similarly to the first embodiment, a photoelectric conversion device capable of acquiring the focus detection signal with favorable accuracy while suppressing an increase in reading time is provided. Furthermore, in the present embodiment, since the line memory unit 9 is arranged, data sorting is performed such that pieces of data of the same pixel group P read at different timings are collectively output. In this processing, the data of the focus detection signals that are not paired is thinned out and output from the line memory unit 9, and thus, the amount of data to be output can be reduced. As a result, an effect of reducing power consumption can be obtained.

When the focus detection signals are thinned out before digital signal processing, continuity of a signal processing target is lost due to data omission. On the other hand, in the present embodiment, the focus detection signals are thinned out after the digital signal processing by the digital signal processing unit 7. That is, since the data of the focus detection signals that are not paired is not thinned out at the stage of the digital signal processing, the processing can be executed in an output order of signals by the vertical scanning.

Fourth Embodiment

An imaging device according to a fourth embodiment will be described with reference to FIG. 15. The present embodiment is a modified example of the configuration of the digital signal processing unit 7 according to the third embodiment. In the present embodiment, a description of elements common to the first embodiment may be omitted or simplified.

FIG. 15 is a block diagram illustrating a configuration example of the imaging device according to the present embodiment. In the imaging device according to the present embodiment, the digital signal processing unit 7 according to the third embodiment is divided into a first digital signal processing unit 7-1 (first processing unit) and a second digital signal processing unit 7-2 (second processing unit). Processing executed by the first digital signal processing unit 7-1 and the second digital signal processing unit 7-2 according to the present embodiment can correspond to the processing executed by the digital signal processing unit 7 according to the third embodiment. That is, a part of the digital signal processing executed by the digital signal processing unit 7 can be executed by the first digital signal processing unit 7-1, and the rest of the digital signal processing executed by the digital signal processing unit 7 can be executed by the second digital signal processing unit 7-2. That is, the first digital signal processing unit 7-1 and the second digital signal processing unit 7-2 execute different steps of digital signal processing.

As illustrated in FIG. 15, the first digital signal processing unit 7-1 is arranged at a preceding stage of a line memory unit 9, and the second digital signal processing unit 7-2 is arranged at a subsequent stage of the line memory unit 9. A signal output unit 8 is arranged at a subsequent stage of the second digital signal processing unit 7-2. That is, an output signal of the first digital signal processing unit 7-1 is input to the line memory unit 9, and an output signal of the line memory unit 9 is input to the second digital signal processing unit 7-2. An output signal of the second digital signal processing unit 7-2 is input to the signal output unit 8.

Since the line memory unit 9 is arranged at a preceding stage of the second digital signal processing unit 7-2, the second digital signal processing unit 7-2 executes the digital signal processing for data from which data of focus detection signals that are not paired has been thinned out by the line memory unit 9. As the amount of data is reduced, power consumption of the second digital signal processing unit 7-2 is reduced. Therefore, the power consumption of the first digital signal processing unit 7-1 and the second digital signal processing unit 7-2 according to the present embodiment can be reduced to be lower than the power consumption of the digital signal processing unit 7 according to the third embodiment.

As described above, in the present embodiment, a photoelectric conversion device capable of obtaining the same effects as those of the first embodiment and the third embodiment is provided. In addition, in the present embodiment, the power consumption can be reduced as compared with the photoelectric conversion device according to the third embodiment.

The first digital signal processing unit 7-1 does not have to be provided. In this case, the digital signal processing is executed by the second digital signal processing unit 7-2 provided at a subsequent stage of the line memory unit 9. As a result, the power consumption can be further reduced.

Fifth Embodiment

Figure 16:
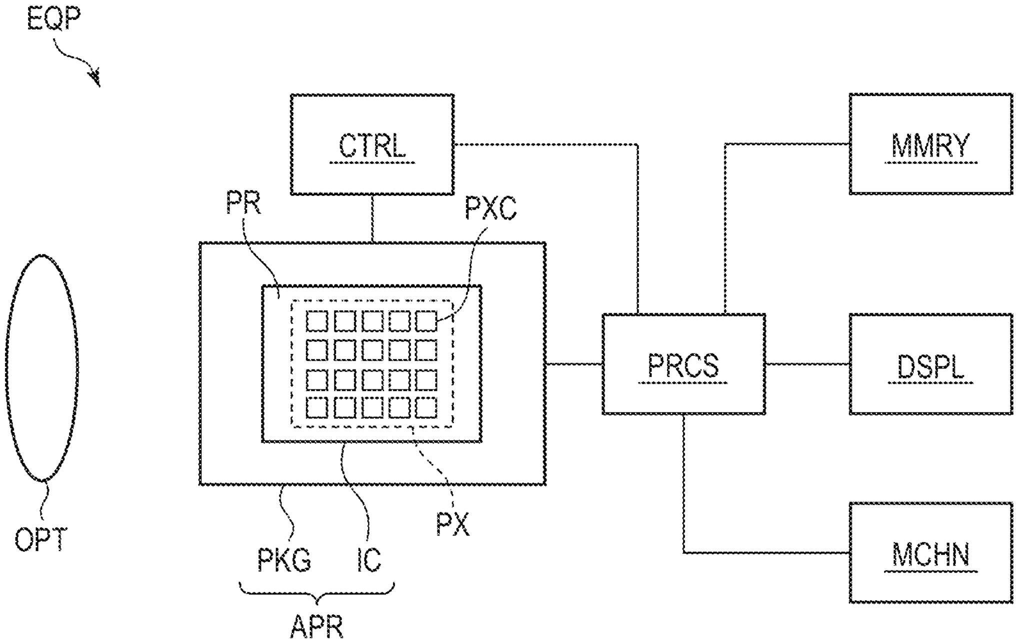
FIG. 16 is a block diagram illustrating a schematic configuration of equipment according to a fifth embodiment.

Equipment according to a fifth embodiment of the present disclosure will be described with reference to FIG. 16. FIG. 16 is a block diagram illustrating a schematic configuration of the equipment according to the present embodiment.

FIG. 16 is a schematic diagram illustrating equipment EQP including a photoelectric conversion device APR. The photoelectric conversion device APR has the functions of the photoelectric conversion devices according to the first to fourth embodiments. A part of or the entire photoelectric conversion device APR is a semiconductor device IC. The photoelectric conversion device APR according to this example can be used as, for example, an image sensor, an auto focus (AF) sensor, a photometric sensor, a ranging sensor, or the like. The semiconductor device IC has a pixel area PX in which pixel circuits PXC each including a photoelectric conversion unit are arranged in a matrix. The semiconductor device IC can have a peripheral area PR around the pixel area PX. Circuits other than the pixel circuits can be arranged in the peripheral area PR.

The photoelectric conversion device APR may have a structure (chip stacked structure) in which a first semiconductor chip in which a plurality of photoelectric conversion units are provided and a second semiconductor chip in which peripheral circuits are provided are stacked. Each of the peripheral circuits in the second semiconductor chip can be a column circuit corresponding to a pixel column of the first semiconductor chip. In addition, each of the peripheral circuits in the second semiconductor chip can be a matrix circuit corresponding to a pixel or a pixel block of the first semiconductor chip. A through electrode (TSV), an inter-chip wiring by direct bonding of a conductor such as copper, connection by a microbump between chips, connection by wire bonding, or the like can be adopted for connection between the first semiconductor chip and the second semiconductor chip.

The photoelectric conversion device APR can include a package PKG that accommodates the semiconductor device IC in addition to the semiconductor device IC. The package PKG can include a base to which the semiconductor device IC is fixed, a lid body such as glass facing the semiconductor device IC, and a connection member such as a bonding wire or a bump that connects a terminal provided on the base and a terminal provided on the semiconductor device IC.

The equipment EQP can further include at least one of an optical device OPT, a control device CTRL, a processing device PRCS, a display device DSPL, a storage device MMRY, and a mechanical device MCHN. The optical device OPT corresponds to the photoelectric conversion device APR as the photoelectric conversion device, and is, for example, a lens, a shutter, or a mirror. The control device CTRL controls the photoelectric conversion device APR, and is, for example, a semiconductor device such as an application specific integrated circuit (ASIC). The processing device PRCS processes a signal output from the photoelectric conversion device APR, and forms an analog front end (AFE) or a digital front end (DFE). The processing device PRCS is a semiconductor device such as a CPU or an ASIC. The display device DSPL is an EL display device, a liquid crystal display device, or the like that displays information (image) obtained by the photoelectric conversion device APR. The storage device MMRY is a magnetic device, a semiconductor device, or the like that stores information (image) obtained by the photoelectric conversion device APR. The storage device MMRY is a volatile memory such as a static random access memory (SRAM) or a dynamic random access memory (DRAM), or a nonvolatile memory such as a flash memory or a hard disk drive. The mechanical device MCHN includes a movable unit such as a motor or an engine, or a propulsion unit. In the equipment EQP, a signal output from the photoelectric conversion device APR is displayed on the display device DSPL or transmitted to the outside by a communication device (not illustrated) included in the equipment EQP. Therefore, the equipment EQP preferably further includes the storage device MMRY and the processing device PRCS in addition to a storage circuit unit and an arithmetic circuit unit included in the photoelectric conversion device APR.

The equipment EQP illustrated in FIG. 16 can be electronic equipment such as an information terminal (for example, a smartphone or a wearable terminal) having a photographing function or a camera (for example, an interchangeable-lens camera, a compact camera, a video camera, or a monitoring camera). The mechanical device MCHN in the camera can drive parts of the optical device OPT for zooming, focusing, and shutter operation. In addition, the equipment EQP may be transport equipment (moving body) such as a vehicle, a ship, or a flying body. In addition, the equipment EQP may be medical equipment such as an endoscope or a computed axial tomography (CT) scanner.

The mechanical device MCHN in the transport equipment can be used as a mobile device. The equipment EQP as the transport equipment is suitable for transporting the photoelectric conversion device APR, assisting and/or automating driving (steering) by the photographing function, and the like. The processing device PRCS for assisting and/or automating driving (steering) can execute processing for operating the mechanical device MCHN as the mobile device based on information obtained by the photoelectric conversion device APR.

The photoelectric conversion device APR according to the present embodiment can provide a high value to a designer, a manufacturer, a seller, a purchaser, and/or a user thereof. Therefore, if the photoelectric conversion device APR is mounted on the equipment EQP, the value of the equipment EQP can also be increased. Therefore, in manufacturing and selling the equipment EQP, it is advantageous to determine mounting of the photoelectric conversion device APR according to the present embodiment on the equipment EQP in order to increase the value of the equipment EQP.

Sixth Embodiment

Figures 17A, 17B:
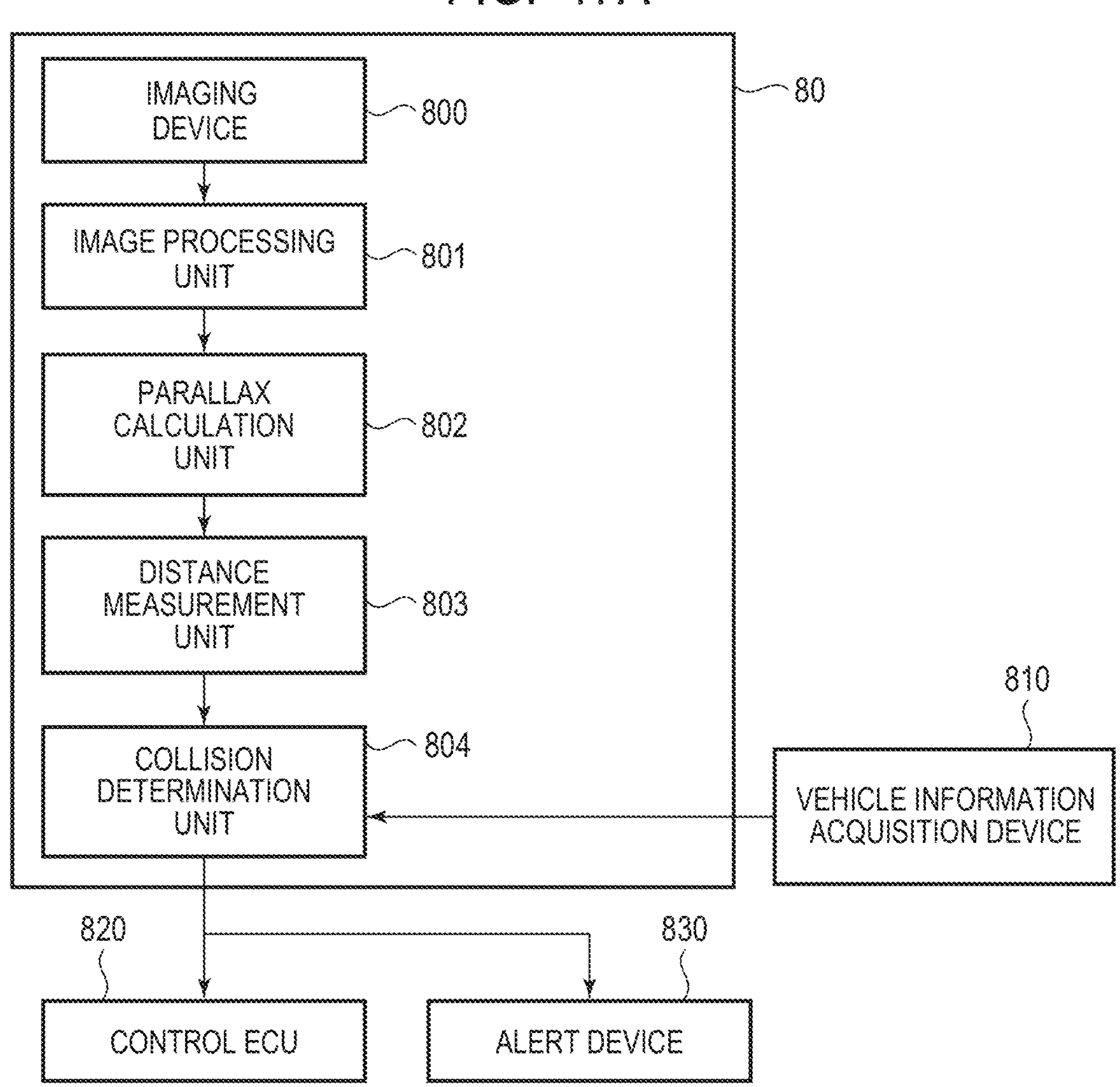
FIGS. 17A and 17B are block diagrams of equipment according to a sixth embodiment.

FIGS. 17A and 17B are block diagrams of equipment relating to the vehicle-mounted camera according to the present embodiment. FIGS. 17A and 17B illustrate an example in which the photoelectric conversion device is applied to a movable body such as a vehicle. The equipment 80 includes an imaging device 800 and a signal processing device (processing device) that processes a signal from the imaging device 800. The equipment 80 includes an image processing unit 801 that performs image processing on a plurality of pieces of image data acquired by the imaging device 800, and a parallax calculation unit 802 that calculates parallax (phase difference of parallax images) from the plurality of pieces of image data acquired by the equipment 80. The equipment 80 includes a distance measurement unit 803 that calculates a distance to an object based on the calculated parallax, and a collision determination unit 804 that determines whether or not there is a possibility of collision based on the calculated distance. Here, the parallax calculation unit 802 and the distance measurement unit 803 are examples of a distance information acquisition unit that acquires distance information to the object. That is, the distance information is information on a parallax, a defocus amount, a distance to the object, and the like. The collision determination unit 804 may determine the possibility of collision using any of these pieces of distance information. The distance information acquisition unit may be realized by dedicatedly designed hardware or software modules. Further, it may be realized by a field programmable gate array (FPGA), an application specific integrated circuit (ASIC) or a combination thereof.

The equipment 80 is connected to the vehicle information acquisition device 810, and can obtain vehicle information such as a vehicle speed, a yaw rate, and a steering angle. Further, the equipment 80 is connected to a control ECU 820 which is a control device that outputs a control signal for generating a braking force to the vehicle based on the determination result of the collision determination unit 804. The equipment 80 is also connected to an alert device 830 that issues an alert to the driver based on the determination result of the collision determination unit 804. For example, when the collision possibility is high as the determination result of the collision determination unit 804, the control ECU 820 performs vehicle control to avoid collision or reduce damage by braking, returning an accelerator, suppressing engine output, or the like. The alert device 830 alerts the user by sounding an alarm such as a sound, displaying alert information on a screen of a car navigation system or the like, or giving vibration to a seat belt or a steering wheel. The equipment 80 functions as a control unit that controls the operation of controlling the vehicle as described above.

In the present embodiment, an image of the periphery of the vehicle, for example, the front or the rear is captured by the equipment 80. FIG. 17B illustrates equipment in a case where an image is captured in front of the vehicle (image capturing range 850). The vehicle information acquisition device 810 as the imaging control unit sends an instruction to the equipment 80 or the imaging device 800 to perform the imaging operation. With such a configuration, the accuracy of distance measurement can be further improved.

Although the example of control for avoiding a collision to another vehicle has been described above, the embodiment is applicable to automatic driving control for following another vehicle, automatic driving control for not going out of a traffic lane, or the like. Furthermore, the equipment is not limited to a vehicle such as an automobile and can be applied to a movable body (movable apparatus) such as a ship, an airplane, a satellite, an industrial robot and a consumer use robot, or the like, for example. In addition, the equipment can be widely applied to equipment which utilizes object recognition or biometric authentication, such as an intelligent transportation system (ITS), a surveillance system, or the like without being limited to movable bodies.

MODIFIED EMBODIMENTS

The present invention is not limited to the above embodiments, and various modifications are possible. For example, an example in which some of the configurations of any one of the embodiments are added to other embodiments or an example in which some of the configurations of any one of the embodiments are replaced with some of the configurations of other embodiments are also embodiments of the present invention.

The disclosure of this specification includes a complementary set of the concepts described in this specification. That is, for example, if a description of "A is B" (A=B) is provided in this specification, this specification is intended to disclose or suggest that "A is not B" even if a description of "A is not B" (A≠B) is omitted. This is because it is assumed that "A is not B" is considered when "A is B" is described.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-024377, filed Feb. 21, 2024, which is hereby incorporated by reference herein in its entirety.

What is claimed is:

1. A photoelectric conversion device comprising:

a plurality of microlenses arranged so as to form a plurality of rows and a plurality of columns; and a pixel array including a plurality of unit pixels arranged corresponding to the plurality of microlenses, respectively, wherein each of the plurality of unit pixels includes a first photoelectric conversion unit and a second photoelectric conversion unit, wherein reading from the pixel array is performed in a first mode in which a signal based on charges obtained by adding a charge generated in the first photoelectric conversion unit and a charge generated in the second photoelectric conversion unit is read, and a second mode in which a signal based on a charge generated in any one of the first photoelectric conversion unit and the second photoelectric conversion unit is read, and then a signal based on charges obtained by adding a charge generated in the first photoelectric conversion unit and a charge generated in the second photoelectric conversion unit is read, wherein reading control is performed on the pixel array, the pixel array being divided into a plurality of regions including a first region, a second region, and a third region arranged between the first region and the second region, wherein reading from unit pixels of all rows included in the first region is performed in the first mode, wherein reading from unit pixels of all rows included in the second region is performed in the second mode, and wherein reading from unit pixels of some rows included in the third region is performed in the first mode, and reading from unit pixels of other rows is performed in the second mode.

2. The photoelectric conversion device according to claim 1, wherein the plurality of unit pixels include a first unit pixel and a second unit pixel, and wherein a charge generated in the first photoelectric conversion unit of the first unit pixel, a charge generated in the second photoelectric conversion unit of the first unit pixel, a charge generated in the first photoelectric conversion unit of the second unit pixel, and a charge generated in the second photoelectric conversion unit of the second unit pixel are transferred to one floating diffusion.

3. The photoelectric conversion device according to claim 2, wherein the first unit pixel and the second unit pixel are arranged in the same column.

4. The photoelectric conversion device according to claim 3, wherein the first unit pixel and the second unit pixel are arranged adjacent to each other in the same column.

5. The photoelectric conversion device according to claim 2, wherein the first unit pixel and the second unit pixel have sensitivity to light of different colors.

6. The photoelectric conversion device according to claim 2, wherein each of the first unit pixel and the second unit pixel is included in the third region, wherein reading from the first unit pixel is performed in the first mode, and wherein reading from the second unit pixel is performed in the second mode.

7. The photoelectric conversion device according to claim 6, wherein the reading from the first unit pixel and the reading from the second unit pixel are performed at different timings.

8. The photoelectric conversion device according to claim 2 further comprising a plurality of output lines arranged corresponding to the plurality of columns, respectively, wherein a signal read from the first unit pixel and a signal read from the second unit pixel are both output to the same output line among the plurality of output lines.

9. The photoelectric conversion device according to claim 2 further comprising four or more output lines arranged corresponding to the plurality of columns, respectively, wherein a signal read from the first unit pixel and a signal read from the second unit pixel are both output to the same output line among the four or more output lines.

10. The photoelectric conversion device according to claim 1 further comprising a memory configured to hold a digital signal based on the signals read in the first mode and the second mode, wherein the memory does not output a digital signal based on the charge generated by any one of the first photoelectric conversion unit and the second photoelectric conversion unit among signals read from the unit pixels of the third region in the second mode.

11. The photoelectric conversion device according to claim 10, wherein the memory deletes the digital signal in a case of holding the digital signal based on the charge generated by any one of the first photoelectric conversion unit and the second photoelectric conversion unit among the signals read from the unit pixels of the third region in the second mode.

12. The photoelectric conversion device according to claim 10, wherein the memory delays and outputs a part of the input digital signal.

13. The photoelectric conversion device according to claim 10 further comprising a first processing unit configured to execute digital signal processing, wherein the first processing unit is arranged at a preceding stage of the memory.

14. The photoelectric conversion device according to claim 10 further comprising a second processing unit configured to execute digital signal processing, wherein the second processing unit is arranged at a subsequent stage of the memory.

15. The photoelectric conversion device according to claim 10 further comprising a first processing unit and a second processing unit each configured to execute different digital signal processing, wherein the first processing unit is arranged at a preceding stage of the memory, and wherein the second processing unit is arranged at a subsequent stage of the memory.

16. The photoelectric conversion device according to claim 1, wherein the signal read in the first mode is used for image generation, and wherein the signals read in the second mode are used for image generation and focus detection.

17. The photoelectric conversion device according to claim 1, wherein reading in the first mode is simultaneously performed for two unit pixels arranged in the same column among the plurality of unit pixels, and wherein reading in the second mode is simultaneously performed for other two unit pixels arranged in the same column among the plurality of unit pixels at a time different from a time at which the reading in the first mode is performed.

18. The photoelectric conversion device according to claim 1, wherein reading in the first mode and reading in the second mode are not simultaneously performed for all unit pixels arranged in the same column among the plurality of unit pixels.

19. Equipment comprising:

the photoelectric conversion device according to claim 1; and at least any one of:

an optical device adapted for the photoelectric conversion device, a control device configured to control the photoelectric conversion device, a processing device configured to process a signal output from the photoelectric conversion device, a display device configured to display information obtained by the photoelectric conversion device, a storage device configured to store information obtained by the photoelectric conversion device, and a mechanical device configured to operate based on information obtained by the photoelectric conversion device.

20. The equipment according to claim 19, wherein the processing device acquires distance information on a distance from the photoelectric conversion device to an object.

* * * * *